(12) United States Patent
Revashetti et al.

(10) Patent No.: US 6,370,578 B2
(45) Date of Patent: *Apr. 9, 2002

(54) ACTIVE MARKETING BASED ON CLIENT COMPUTER CONFIGURATIONS

(75) Inventors: Siddaraya B. Revashetti, Santa Clara; Chandrasekar Balasubramaniam, Sunnyvale; Babu Katchapalayam, Santa Clara; Ravi Lingarkar, Sunnyvale, all of CA (US)

(73) Assignee: McAfee.com, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/785,676

(22) Filed: Feb. 16, 2001

Related U.S. Application Data

(63) Continuation of application No. 09/430,263, filed on Oct. 29, 1999, now Pat. No. 6,230,199.

(51) Int. Cl.[7] ............................................. G06F 17/60
(52) U.S. Cl. ........................... 709/224; 705/14; 705/28
(58) Field of Search ................................. 709/224, 223; 705/14, 28

(56) References Cited

U.S. PATENT DOCUMENTS

| | | | |
|---|---|---|---|
| 3,969,723 A | 7/1976 | Kennicott | 700/83 |
| 4,558,413 A | 12/1985 | Schmidt et al. | 707/203 |

(List continued on next page.)

FOREIGN PATENT DOCUMENTS

| | | |
|---|---|---|
| WO | 97/33421 | 9/1997 |
| WO | 00/45557 | 8/2000 |

OTHER PUBLICATIONS http://advertising.broadcast.com/ad_demos/index.html http://www.thinkmobile.com/article/00/00/37/.

http://www.dae.com/press.html.

(List continued on next page.)

Primary Examiner—Kenneth R. Coulter
(74) Attorney, Agent, or Firm—Jung-hua Kuo; Christopher J. Hamaty

(57) ABSTRACT

A system and method for actively marketing products and services to a user of a client computer such as over a network are disclosed. A product information database comprising product summary files that facilitate determination of presence or absence of products associated with the client computer, a marketing rule knowledge base comprising opportunity rule files governing marketing opportunities, and an opportunity detection object for determination of marketing opportunities are utilized to determine active marketing opportunities and may be downloaded to the client computer from a service provider computer system. The opportunity detection object may comprise a scan engine, an opportunity analysis engine, and a presentation engine which collectively determine and present marketing information to the client computer user. The scan engine compares the client computer against the product information database to determine the configurations of the client computer and to generate a client computer inventory database. The opportunity analysis engine analyzes the client computer inventory database against the marketing rule knowledge base and generates a list of marketing opportunities for the client computer. The presentation engine analyzes the list of marketing opportunities and provides marketing and/or other information regarding marketed products to the user.

27 Claims, 14 Drawing Sheets

U.S. PATENT DOCUMENTS

| | | | |
|---|---|---|---|
| 4,714,992 A | 12/1987 | Gladney et al. | 707/206 |
| 5,665,951 A | 9/1997 | Newman et al. | 235/375 |
| 5,826,102 A | 10/1998 | Escobar et al. | 707/500.1 |
| 5,864,823 A | 1/1999 | Levitan | 705/14 |
| 5,870,549 A | 2/1999 | Bobo, II | 709/206 |
| 5,913,040 A | 6/1999 | Rakavy et al. | 709/232 |
| 5,918,211 A | 6/1999 | Sloane | 705/16 |
| 5,948,061 A | 9/1999 | Merriman et al. | 709/219 |
| 5,948,104 A | 9/1999 | Gluck et al. | 713/200 |
| 6,009,409 A | 12/1999 | Adler et al. | 705/14 |
| 6,009,410 A * | 12/1999 | LeMole et al. | 705/14 |
| 6,011,537 A | 1/2000 | Slotznick | 345/733 |
| 6,014,698 A | 1/2000 | Griffiths | 709/224 |
| 6,018,710 A | 1/2000 | Wynblatt et al. | 704/260 |
| 6,035,423 A | 3/2000 | Hodges et al. | 714/38 |
| 6,052,531 A | 4/2000 | Waldin, Jr. et al. | 717/11 |
| 6,073,214 A | 6/2000 | Fawcett | 711/133 |
| 6,101,485 A | 8/2000 | Fortenberry | 705/27 |
| 6,101,486 A | 8/2000 | Roberts et al. | 705/27 |
| 6,119,165 A | 9/2000 | Li et al. | 709/229 |
| 6,151,643 A | 11/2000 | Cheng et al. | 710/36 |
| 6,167,407 A | 12/2000 | Nachenberg et al. | 707/203 |
| 6,230,199 B1 * | 5/2001 | Revashetti et al. | 709/224 |
| 6,317,789 B1 * | 11/2001 | Rakavy et al. | 709/224 |

OTHER PUBLICATIONS http://www.grit.net, No date.
http://www.o–a.com/archive/1997/November/0097.html.
http://www.ugeek.com/hwswrev/ppsubhed.htm, No date.
http.www5conf.inria.fr/fich_html/papers/p52/overview.html.
http://www.w3.org/tr/speech–synthesis, No date.
http://www.w3.org/tr/rdf–schema/, No date.
http://www.w3.org/UI/voice/1998/workshop/minutes–13oct98.html.

* cited by examiner

Hardware Finder
New Computer Purchase

Select the user profile that best matches you:

Bargain Hunter
You're on a budget! Whether it's a second PC for the home or another kid going off to college, you're looking for a bargain that will perform all the basic tasks and still deliver good performance.

Business User
You want a system that can run all of today..s leading business applications and has the latest network and communication capabilities for sharing documents with colleagues and clients.

Power/Professional User
You want and need the best system you can get. Whether your job depends on it or you just want it, a high-speed processor, a huge hard disk, lots of memory, and a highly upgradeable system are what you desire.

Home User
You want a little of everything at a reasonable price. Whether it's personal finance, games, email, or working on business documents from home, you need a PC that can handle it all.

Game Player
You want the best multimedia features you can get for the lowest price. 3D graphics, stereo sound, DVD-you want it all.

Road Warrior
You want and need the best system you can get. Whether your job depends on it or you just want it, a high-speed processor, a huge hard disk, lots of memory, and a highly upgradeable system are what you desire.

*FIGURE 6*

ACTIVE MARKETING BASED ON CLIENT COMPUTER CONFIGURATIONS

This application is a continuation of Ser. No. 09/430,267 filed Oct. 29, 1999 now U.S. Pat. No. 6,230,199.

BACKGROUND OF THE INVENTION

1. Field of the Invention

The present invention relates generally to computer systems and computer networks. More specifically, the present invention relates to a method and system for marketing products based upon the detection and analysis of software and hardware components or peripherals present on a client computer.

2. Description of Related Art

With the proliferation of Internet-based technology and sales, it has become increasingly important that companies carefully target their sales and marketing efforts toward appropriate and receptive audiences. Although broadcast print, television, radio, and online banner advertisements retain some effectiveness in winning new customers through exposure to sheer numbers, marketing evolution is leading toward the provision of product information based upon the user's behavior and preferences.

Online profiling coupled with advances in database technology and knowledge base techniques enables increasingly targeted communications with consumers based both upon the stated preferences of those consumers and their prior purchasing behavior.

Certain methods exist today for marketing products to consumers based upon the stated preferences of the consumer. By way of example, a software manufacturer may elect to collect preferences of consumers and potential consumers through a survey. Such a survey can be conducted through the mail, by phone interview, and/or through a Web site. For purposes of clarity in this example, this disclosure will use the example of a survey posted on a Web site. The software manufacturer places a survey on the Web site which is accessed and completed by the consumer. The software manufacturer generally provides some sort of incentive for the consumer to complete the survey. Results of the survey may be collected, stored, aggregated, and analyzed for the purpose of determining the behavior of the consumer. Based on this information, the software manufacturer may choose to send a print advertisement, email communication, or other marketing communication to the consumer based upon the answers to the questions provided on the survey. The marketing communication may be general, based upon grouping the responses into demographic groups, or may be individualized utilizing a knowledge-based determination of the consumer's preferences based upon that consumer's responses.

In another example, a consumer may purchase a new hardware item for a computer system for which the manufacturer includes a registration information packet. This registration information packet could be in the form of a registration card, requesting from the user of the computer system such information as name, address, and phone number and containing a number of questions designed to give the manufacturer insight into the consumer's purchasing behavior, profession, income, and so on. Hardware manufacturers may include an electronic version of the registration packet or may link to the registration packet to the Internet, where the information can be collected immediately into some sort of database storage. When the user returns the registration information to the manufacturer, the manufacturer will then have a record of the manufacturer's product purchased by the user in addition to any of the supplementary information requested and/or supplied by the consumer. Based upon the knowledge of what product the user purchased, when the user purchased the item, and any combination of the supplementary information, the manufacturer can choose to target marketing communications to this user. This technique of collecting registration information is not restricted to hardware manufacturers. Indeed, this collection and use of registration data for marketing purposes is common in all types of business, including products such as software, consumer electronics, appliances, and many other products not related to computer systems.

Disadvantageously, in typical existing mechanisms for collecting, storing, and analyzing consumer preferences, the process of generating notifications of new and related products can be time-consuming and imprecise. These methods of collecting consumer stated preferences and past purchasing behavior rely upon many factors, for example: the consumer responding at all to marketing surveys and/or registration information requests; the consumer accurately answering questions about previously purchased products and answering other system configuration-based questions; properly interpreting the consumer's stated preferences or observed behavior into relevant marketing tactics. To deliver hard-copy product notifications such as brochures, consumers are generally grouped into segments to minimize the number of different targeted product advertisements generated. If a preferred communication is email, the manufacturer and/or distributor must customize the email communication and send it after the fact. It would be more desirable for communications regarding the new or related product to be based on firm, timely knowledge of a consumer's computing environment and delivered in a timely manner.

A method for scanning the user's computer for the presence of certain software programs for the purpose of providing updates to those software programs is disclosed in the application, "Automatic Updating of Diverse Software Products on Multiple Client Computer Systems", U.S. Ser. No. 08/660,488, now U.S. Pat. No. 6,151,643 filed on Jun. 7, 1996 which is incorporated herein by reference in its entirety. A similar method is currently in use at the Web site http://www.mcafee.com, the contents of which are incorporated by reference as of the filing date of the present patent application.

FIG. 1 shows a system 100 for updating diverse software products on a user computer system similar to the method of Ser. No. 08/660,488. System 100 comprises a plurality of vendor computer systems 102 communicatively coupled via the Internet 106 to a service provider computer system 106 containing an update information database 108, to which a user computer 110 containing an update application is also coupled.

Service provider computer system 106 comprises, among other elements described in Ser. No. 08/660,488, an update information database 108. Update information database 108 contains information, such as update name, version, location, installation instructions and the like, about products for which updates are available. Client computer 110 comprises an update application 112 for periodically communicating with the service provider computer system 106 for checking against the contents of the client computer 110 products specified in the update information database 108. If a product specified in the product information database 108 is identified on the client computer 110, the client computer is placed in communication with the relevant vendor computer system 102 to download or install the software update.

However, it would be desirable to provide a system for marketing software, hardware, and related products to users of computer systems based upon the user's current computing environment configuration.

It would be further desirable to provide a system for the marketing of products that are not yet detected on the user's computer, based upon a combination of the absence and/or presence of hardware peripherals and/or software on or connected to the client computer.

It would be further desirable to provide a system that is relevant and compelling to the individual user by ensuring that the related product information provided is based upon the individual user's computing environment configuration.

SUMMARY OF THE INVENTION

A method and system for actively marketing products to a user of a client computer that is coupled over a network to a service provider computer system are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The system generally comprises a product information database, a marketing rule knowledge base, and a opportunity detection object. The product information database comprising product summary files that facilitate determination of presence or absence of products associated with the client computer, the marketing rule knowledge base comprising opportunity rule files governing marketing opportunities, and the opportunity detection object for determination of marketing opportunities are utilized to determine active marketing opportunities and may be downloaded to the client computer from a service provider computer system. The opportunity detection object may comprise a scan engine, an opportunity analysis engine, and a presentation engine which collectively determine and present marketing information to the client computer user. The scan engine compares the client computer against the product information database to determine the configurations of the client computer and to generate a client computer inventory database. The opportunity analysis engine analyzes the client computer inventory database against the marketing rule knowledge base and generates a list of marketing opportunities for the client computer. The presentation engine analyzes the list of marketing opportunities and provides marketing and/or other information regarding marketed products to the user.

In a preferred embodiment, a product information database, a marketing rule knowledge base and an opportunity detection object are downloaded to a client computer from a service provider computer system. The opportunity detection object is executed to analyze the configuration of the client computer and generate a list of marketing opportunities.

According to a preferred embodiment, the opportunity detection object comprises a scan engine, an opportunity analysis engine and a presentation engine. These engines collectively serve to scan a current configuration of a client computer, analyze the current configuration for marketing opportunities, and present marketing information to a user of the client computer.

The scan engine compares the signatures resident on the client computer for the client hardware and client applications against the product information database that may be downloaded to the client computer. The product information database comprises one or a plurality of product summary files enabling the opportunity analysis engine to detect the presence of a product on the client computer. If the scan engine detects the parameters specified in the product summary file for a product on or connected to the client computer, the scan engine records information for the matched product in an inventory database, which generally comprised of a list of existing products associated with the client computer.

The opportunity analysis engine generates a list of marketing opportunities for the client computer by analyzing the inventory database against the marketing rule knowledge base. The marketing rule knowledge base preferably comprises one or a plurality of opportunity rule files indicating the opportunity key for a related product that may be marketed to the user of the client computer and information about how to present the marketing opportunity to the end user. The opportunity analysis engine processes the inventory database on the client computer to determine whether the appropriate conditions exist for marketing a related product to the user of the client computer. When an opportunity is detected, the opportunity analysis engine records information for the match in a list of marketing opportunities.

The presentation engine analyzes the list of marketing opportunities generated by the opportunity analysis engine and provides information regarding related products to the user of the client computer. Related products may be, by way of example, software applications, hardware items such as additional memory, as well as services such as support, training, connectivity service, and the like. The examples presented herein should in no way be construed as limiting the types of products that may be marketed to the user of the client computer. The marketing information presented to the user may be a commerce opportunity, an advertisement displayed to the user, additional information about a related product, and the like based upon the context of the configuration of the user's client computer. Examples of further information about the related product include, but are not limited to, a download location, a purchase location, a search at a vendor's search engine, and the like. Information regarding related products may also be presented to the user of the client computer via any number of methods, from displaying the information on the user's screen, to a communication sent separately to the user. It is emphasized that these are examples of related marketing information and presentation methods and should in no way be construed as limiting the scope or context of a preferred embodiment.

Using the method and system provided herein, a service provider is able to accurately determine the current configuration of a client computer and distribute relevant marketing information about related products directly to a user of the client computer without having to rely solely upon a user's stated preferences or observed behavior.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 3-1 and 3-2 are flowcharts of the overall method of providing marketing information in accordance with a preferred embodiment;

FIG. 6 is an example of a user profile in accordance with a preferred embodiment;

DESCRIPTION OF SPECIFIC EMBODIMENTS

A system and method for actively marketing products to a user of a client computer that is generally coupled over a network to a service provider computer system are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Overview and General Architecture of a System for Active Marketing

Figure 2:
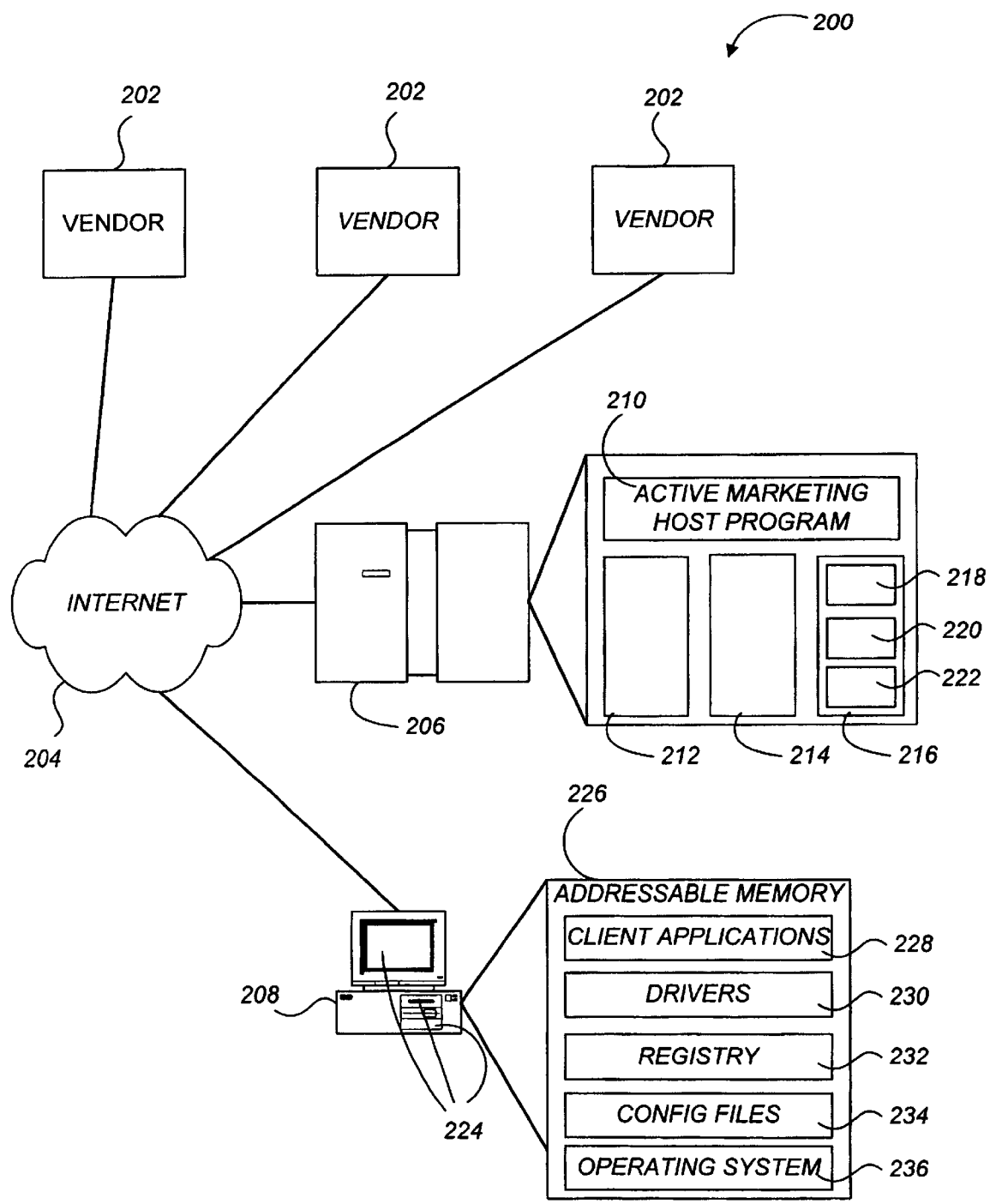
FIG. 2 shows a system for marketing products according to a preferred embodiment.

FIG. 2 shows the architecture of a system 200 in accordance with a preferred embodiment. In system 200, a plurality of vendor computer systems 202 is communicatively coupled by a network 204, such as the Internet, to a service provider computer system 206 and to a client computer 208.

In accordance with a preferred embodiment, service provider computer system 206 hosts an active marketing host program 210, a product information database 212, a marketing rule knowledge base 214, and an opportunity detection object 216. Opportunity detection object 216 further comprises a scan method or engine 218, an opportunity analysis method or engine 220, and a presentation method or engine 222.

The client computer 208 comprises a plurality of hardware items or peripherals 224 and an addressable memory 226. Resident in the addressable memory may be a plurality of client applications 228, a plurality of drivers 230, a registry 232, a plurality of configuration files 234, and an operating system 236. It is important to note that hardware items or peripherals 224 may be any hardware device, for example, one that is generally connected to the client computer 208 such as a hard disk or a monitor, or one that may be temporarily connected to the client computer 208, such as a Palm Computing® connected organizer or an Iomega® JAZ drive.

The product information database 212 contains information regarding one or more products for which a marketing opportunity exists. In a preferred embodiment, the product information database 212 is downloaded to the client computer upon execution of the active marketing host program 210. Preferably, the downloading is initiated by the user at the client computer. The product information database 212 is further described below with reference to FIG. 5.

The marketing rule knowledge base 214 contains for each product in the product information database 212 information about the marketing opportunities for that product, including a set of conditions that indicates a match for a marketing opportunity. In a preferred embodiment, the marketing rule knowledge base 214 is downloaded to the client computer upon execution of the active marketing host program 210. The marketing rule knowledge base 214 is described in further detail with reference to FIG. 10.

In a preferred embodiment, the opportunity detection object 216 contains the overall operation of a method for marketing based upon the detection and analysis of files and/or other configurations, hardware or software, present on the client computer. The opportunity detection object 216 is preferably downloaded to the client computer 208 upon execution of the active marketing host program 210 and may be executed locally thereon in a preferred embodiment. Upon download, the opportunity detection object 216 is installed into the addressable memory 226 of the client computer 208, either in whole or in parts, preferably with a unique identifier. The opportunity detection object 216 may be implemented as Active X controls, Java applets, Perl scripts or any other suitable client-side applications. The opportunity detection object 216 may be instantiated by referring to its unique identifier or the unique identifiers of its component parts through an Application Programming Interface (API). By way of example but not limitation, a Web browser on the client computer 208 may read a Web page and encounter a VBScript directive to run the opportunity detection object 216 using its unique identifier. This VBScript directive may be interpreted through the Web browser's API and the opportunity detection object 216 is executed on the client computer 208.

The methods 218, 220, 222 of the opportunity detection object 216 collectively serve to scan the current configuration of the client computer 208, analyze the current configuration of the client computer 208 for marketing opportunities, and present marketing information to a user of the client computer 208. The methods 218, 220, 222 of the opportunity detection object 216 may be called separately during the execution of the opportunity detection object 216.

Each method of the opportunity detection object 216 will now be described in more detail. In particular, the scan method 218 analyzes the client computer 208 to detect the presence of hardware items 224, client applications 228 or other properties of the client computer 208, such as the operating system 236. If the scan method 218 detects the parameters specified in the product information database 212 indicating the presence of a product on the client computer 208, the scan method 218 optionally records the match. The scan method 218 is described in further detail with reference to FIG. 8.

The opportunity analysis method 220 analyzes the results of the scan method 218 against data in the marketing rule knowledge base 214. The opportunity analysis method 220 determines whether the appropriate conditions exist for marketing a particular product or type of product to the user of the client computer 208. When an opportunity is detected, the opportunity analysis method 220 optionally records information for the match.

The presentation method 222 analyzes the results of the opportunity analysis method 220 and provides information regarding related products to the user of the client computer 208. It is important to note that the presentation method 222 may be executed each time the client computer 208 connects to the service provider computer system 206 in order to provide contextual advertising to the user through, for example, the execution of a client-side control that displays advertising campaigns relevant to the configuration of the client computer 208 connected to the service provider computer system 206.

It is important to note that it is not necessary to download the product information database 212, the marketing rule knowledge base 214, and/or the opportunity detection object 216 to the client computer 208. These items could remain on the service provider computer system 206 and run across the network 204 against the client computer 208. However downloading these items to the client computer 208 reduces the bandwidth requirements of executing programs across the network over a communications device, such as a modem.

Overview and General Method for Active Marketing

Figure 1:
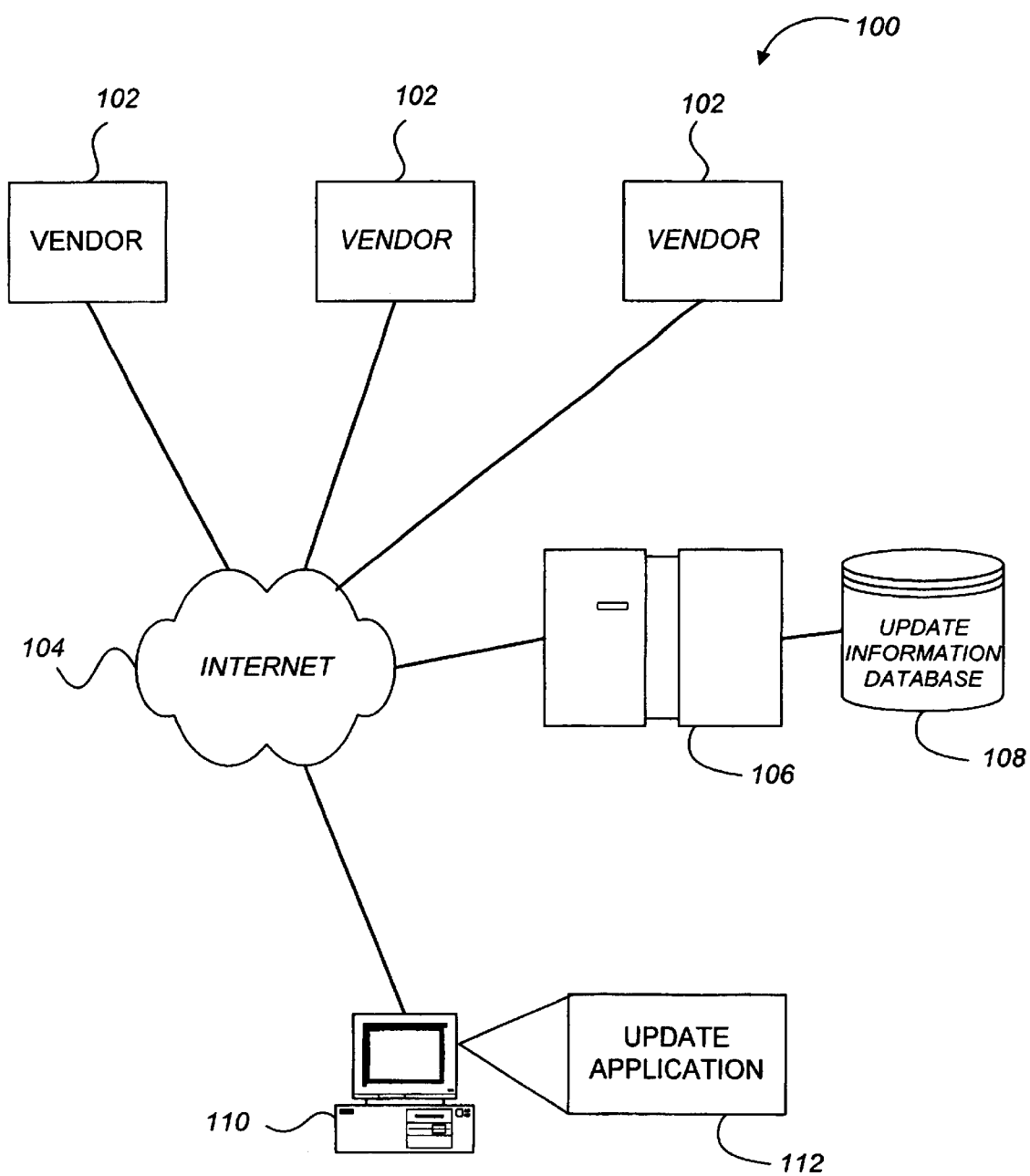
FIG. 1 is an illustration of a system for providing diverse software product updates to a client computer according to the prior art.
Figures 1, 3:
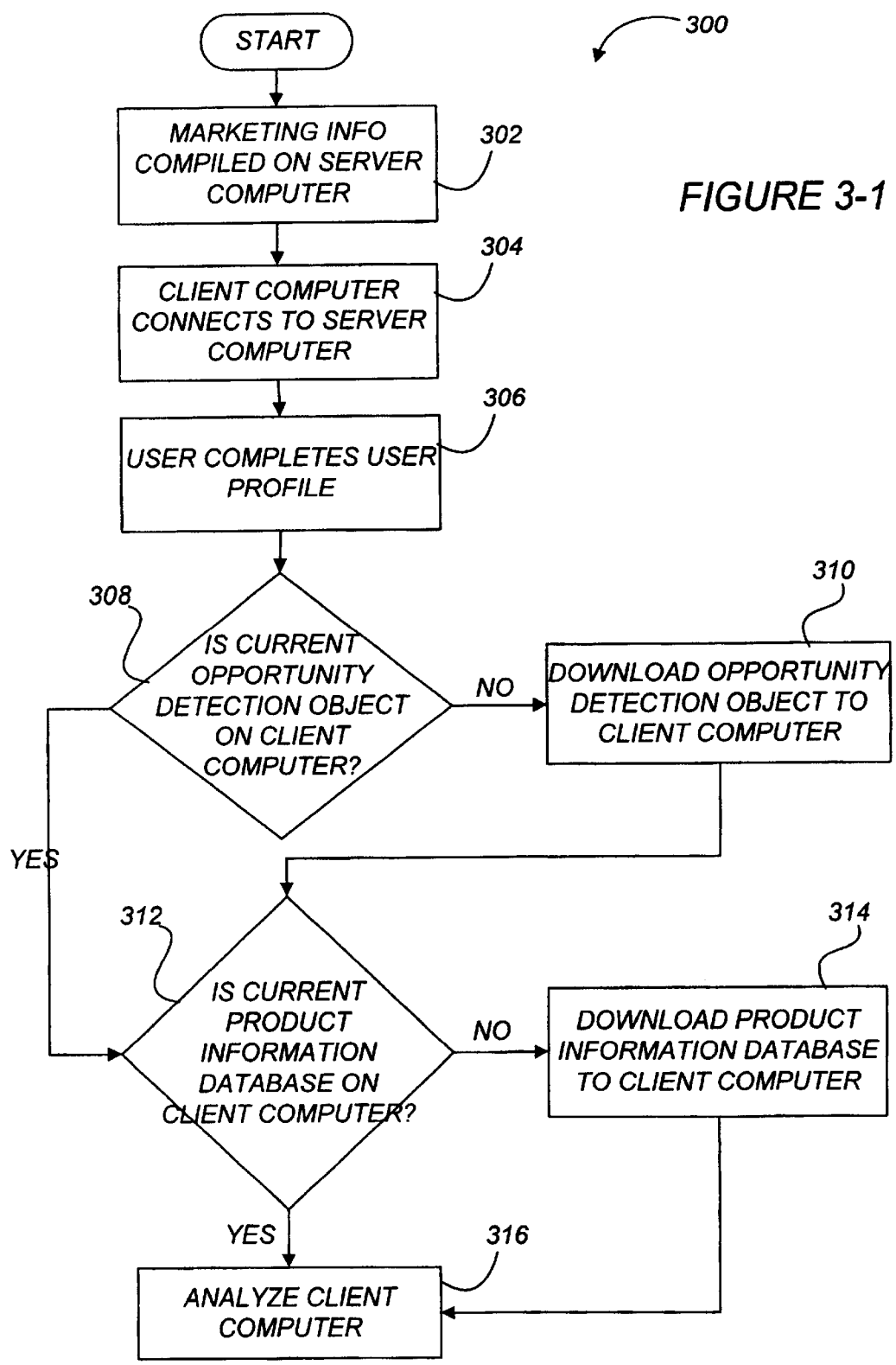
Figures 2, 3:
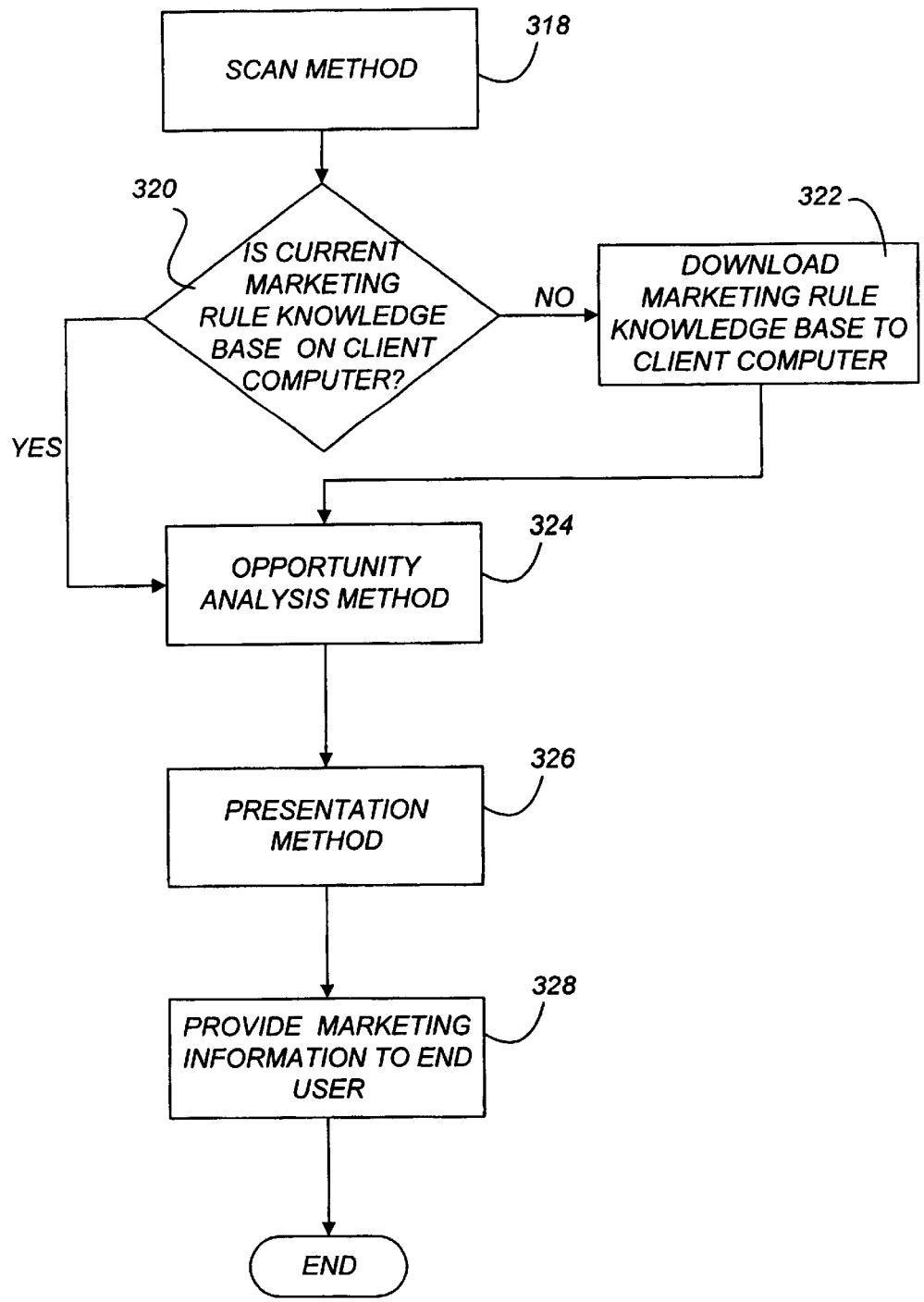

FIGS. 3-1 and 3-2 illustrate an overall operation 300 of the method for marketing products and/or services to the user at the client computer, preferably utilizing the system as shown in and described with reference to FIG. 2. Although the system and method of the present invention are generally described in terms of marketing products, it is to be understood that services, tickets, and the like may be marketed. At step 302, a service provider compiles related product marketing information onto the service provider computer system in the form of the product information database and the marketing information database. This information may be compiled by experts, either manually or electronically, preferably while utilizing product presence conditions that indicate the presence of a product on the client computer and marketing opportunity conditions on the client computer that indicate an opportunity to market a product to the user of the client computer. Typically, the conditions are predetermined and stored in the service provider computer system.

At step 304, the client computer connects to a Web site located on the service provider computer system. In a preferred embodiment, the service provider may request the user to initiate the scan of the client computer by providing a link to initiate the active marketing host program resident on the service provider computer system. In another preferred embodiment, the act of visiting the service provider computer system would initiate the active marketing host program, which would be a more intrusive way of marketing products and/or services to the user of the client computer.

Optionally, the user of the client computer completes a user profile at step 306. The implementation of the user profile is flexible. By way of example, but not limitation, the user profile may include a number of predefined profile options provided by the service provider computer system from which the user may select. Alternately, the user profile may comprise a series of questions designed to elicit further stated preference information from the user of the client computer, such as user address, phone number, ZIP code, and the like. In another preferred embodiment, the user profile may be a combination of predefined profile and stated preference elements. The user profile or relevant elements thereof are optionally downloaded to the client computer for use by the opportunity detection object, preferably by the opportunity analysis method.

In a preferred embodiment, at step 308, the active marketing host program resident on the service provider computer system analyzes the client computer to determine whether the current version of the opportunity detection object is found on the client computer. If the current version of the opportunity detection object is not found on the client computer, the version of the opportunity detection object resident on the service provider computer system may be downloaded to the client computer, at step 310. Alternately, if the current version of the opportunity detection object is found on the client computer, the opportunity detection object is not downloaded. In another aspect of a preferred embodiment (not shown), the user of the client computer may be informed by means of a message transmitted to the client computer whether or not the opportunity detection object is current and given the option of executing the download step 310 if the opportunity detection object is not current. An affirmative response would result in downloading the opportunity detection object to the client computer.

It is also important to note that the opportunity detection object may be downloaded in a single connection between the client computer and the service provider computer system or may be downloaded in multiple connections across the network.

Once the opportunity detection object, and preferably the current version thereof, is resident on the client computer, the active marketing host program checks to determine whether the current version of the product information database is detected on the client computer at step 312. If the current version of the product information database is not found on the client computer, the version of the product information database resident on the service provider computer system is optionally downloaded to the client computer at step 314. If the current version of the product information database is found on the client computer, the product information database is not downloaded.

Once the product information database, and preferably the current version thereof, is found on the client computer, the method progresses to step 316, which begins the analysis of the client computer to determine which products in the product information database are present on the client computer. According to a preferred embodiment, the analysis of the client computer is performed on the client computer using the opportunity detection object on the client computer. However, an alternate preferred embodiment performs the analysis across the network using procedures stored and executed on the service provider computer system to analyze the client computer.

At step 318 the scan method is executed to analyze the client computer and create an inventory database (reference numeral 402 as shown and to be described with reference to FIG. 4). This inventory database is stored on the client computer and is described in further detail below with reference to FIG. 7. In a preferred embodiment, the inventory database remains on the client computer and is not transmitted across the network to a receiving computer system in order to preserve the privacy of the user. However, in another preferred embodiment in which the service provider desires to provide user client configuration directly to vendors, the inventory database may be transmitted to the service provider computer system or to one or more vendor computer systems. A preferred embodiment of the scan method is detailed in reference to FIGS. 8 and 9.

At step 320 of a preferred embodiment, the active marketing host program searches for the presence of the current version of the marketing rule knowledge base on the client computer. If the current version of the marketing rule knowledge base is not found on the client computer, the marketing rule knowledge base on the service provider computer system is downloaded to the client computer in step 322. If the current version of the marketing rule knowledge base is found on the client computer, the marketing rule knowledge base is not downloaded.

It is also important to note that the marketing rule knowledge base may be downloaded as a single file containing all marketing opportunities in a single connection between the client computer and the service provider computer system or it may be downloaded as multiple files based on the products contained in the inventory database that may be downloaded separately using multiple connections across the network.

Each of the analyzing the client computer steps 308, 312, and 318, and the corresponding downloading steps 310, 314, and 322, need not be executed in the order described and may be completed in any suitable order. For example, each of the analyzing steps 308, 312, and 318 may be completed and then any resultant downloading steps may then be executed, either in separate steps or in a single combined downloading step.

Further, although not shown, as noted above, each of steps 308, 312, and 318 of analyzing the client computer to determine whether the current version of the opportunity detection object, the product information database, and the marketing rule knowledge base, respectively, is found on the client computer, as well as the corresponding step of downloading such data to the client computer in steps 310, 314, and 322, respectively, may be optional. For example, the user of the client computer may alternatively be informed by means of a message transmitted to the client computer whether or not a particular object or database is current and, if it is not current, the user is given the option of executing the corresponding download step 310, 314, or 322. An affirmative response would result in the execution of the download step 310, 314, or 322 to the client computer 208.

In another alternative embodiment, the scanning, opportunity analysis, and presentation method or engine of the opportunity detection object may each be optionally downloaded. In other words, although it is preferred that the opportunity detection object be downloaded or not downloaded to the client computer as a whole, each of the components of the opportunity detection object may be individually downloaded or not downloaded. As an example, the scanning engine can be downloaded while the opportunity analysis engine and the presentation engine are not downloaded to the client computer.

Once the opportunity detection object, the product information database, and the marketing rule knowledge base, and preferably the current versions thereof, are found on the client computer, the opportunity analysis method is executed at step 324. In step 324, the inventory database is analyzed against the marketing rule knowledge base to create a list of marketing opportunities (reference numeral 404 as shown and to be described with reference to FIG. 4). The opportunity analysis method identifies a marketing opportunity for a related product by analyzing the information contained in the marketing knowledge base pertaining to the presence or absence of one or many products in the inventory database. The opportunity analysis method is described in further detail below with reference to FIG. 11.

At step 326, the presentation method executes to present the user of the client computer with marketing information regarding products recorded in the list of marketing opportunities. The presentation method will be described in further detail with reference to FIG. 13.

The user may be presented with one or many types of information regarding the marketing opportunity identified based upon the configuration of the client computer at step 328 including, but not limited to, an option to purchase products, advertisements pertaining to the products, further marketing information about the products, an opportunity to search for further related products, and the like.

Contents of Client Computer after Process 300

Figure 4:
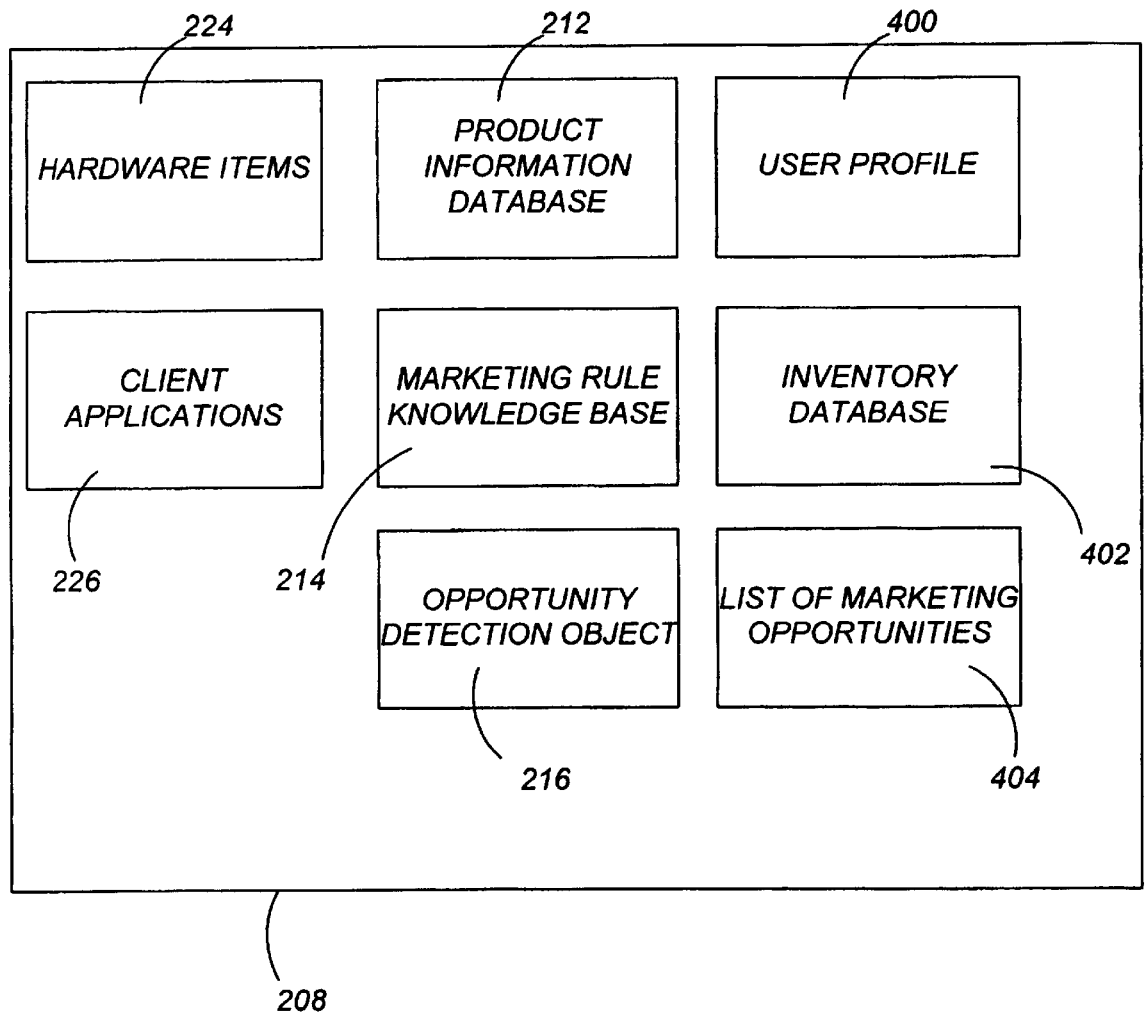
FIG. 4 is an illustration of a client computer following the execution of the method of a preferred embodiment.

FIG. 4 schematically illustrates the contents of the client computer 208 at the conclusion of the process 300 of a preferred embodiment as described in FIGS. 3-1 and 3-2. The hardware items 224, client applications 226 and other items originally comprising the addressable memory 226 of the client computer 208 preferably remain unaltered on the client computer 208. The client computer 208 preferably further contains the product information database 212, the marketing rule knowledge base 214, and the opportunity detection object 216, and more preferably the current versions thereof, as downloaded by the active marketing host program to the client computer 208, described above with reference to FIGS. 3-1 and 3-2. Further, the client computer 208 preferably contains the inventory database 402 as generated by the opportunity detection object as well as the list of marketing opportunities 404 as generated by the presentation method, described above with reference to FIGS. 3-1 and 3-2.

In a preferred embodiment, the user profile 400 is completed by the user of the client computer 208. This user profile is optionally downloaded to the client computer 208 and is used by the opportunity analysis method 220 to further define marketing opportunities on the client computer 208. It is important to note that any of the methods 218, 220, 222 of the opportunity detection object 216 may optionally utilize the user profile 400 to further determine information about the user of the client computer 208.

The inventory database 402 is created by the scan method 218 (executed at step 318 illustrated in FIG. 3-2) using instructions embedded in the scan method 218 itself and optionally using further information compiled in the product information database 212.

The list of marketing opportunities 404 is generated by the opportunity analysis method 220 by comparing the conditions in the marketing rule knowledge base 214 to the inventory database 402 on the client computer 208.

Product Information Database 212: Product Summary Files (PSFs)

Figure 5:
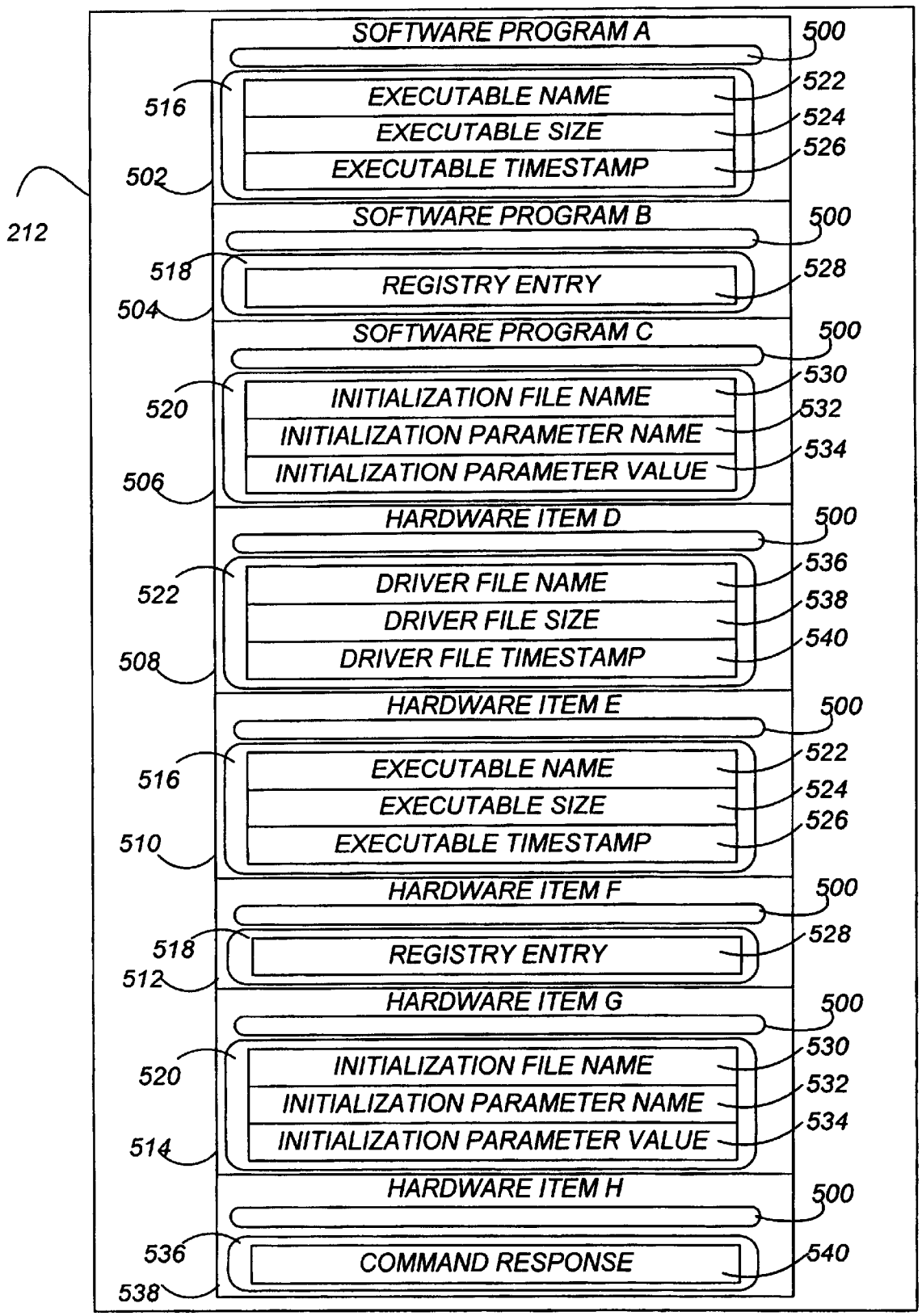
FIG. 5 is a diagram of a product knowledge base according to a preferred embodiment.

FIG. 5 illustrates an example of the product information database 212 in accordance with a preferred embodiment.

The products illustrated in FIG. 5 are software program A, software program B, software program C, hardware item D, hardware item E, hardware item F, hardware item G, and hardware H.

The product information database 212 comprises product summary or signature files (PSFs) for each product. Each PSF comprises a detection command 500 and a product signature. The detection command 500 for each PSF comprises a command sub-component of the scan method that, like the opportunity detection object, may be implemented as Active X controls, Java applets, Perl scripts or any other suitable client-side application. The product signature comprises the response and/or values that indicate the presence of a product on the client computer. It is important to note that a PSF may comprise multiple detection commands 500 and/or multiple product signatures.

Examples of PSFs are illustrations in FIG. 5. In particular, FIG. 5 illustrates a PSF for each of software programs A–C 502, 504, 506 and a PSF for each of hardware items D–H 508, 510, 512, 514, and 538.

Illustrated, also, are examples of product signature types contained in the PSFs, as described in a preferred embodiment: an executable-type product signature 516, a registry-type product signature 518, an initialization type product signature 520, a driver-type product signature 522. It is important to note that other product signature types are possible and that the specific product signature types discussed herein are provided merely for the purposes of illustration.

The executable-type product signature 516 generally comprises executable file properties that indicate the existence of a product on the client computer 208. Examples of executable file properties illustrated are: an executable name 522, an executable file size 524, and an executable timestamp 526. Other file properties may be included in the executable-type product signature 516. To identify the executable-type product signature 516 for software program A, the scan method 218 calls an Active X control specified by the detection command 500, for example, that searches the hard drive of the client computer 208 for the executable name PROGRAMA.EXE with a last modified date of Jan. 01, 1999 and a size value between 50 KB and 100 KB. If a file is found by the scan method 218 on the client computer 208 that meets these criteria, it constitutes a product match and information for product A is written into the inventory database 402.

The registry-type product signature 518 generally comprises a registry entry 528 that indicates the existence of a product on the client computer 208. To identify a registry-type product signature 518 for software program B, the scan method 218 calls an Active X control specified by the detection command 500, for example, to scan the Windows registry of the client computer 208 for a key that matches the pattern specified in the product signature 518. For example, a sample registry-type signature file 518 may match the following registry key:
HKEY_LOCAL_
MACHINE\SOFTWARE\ACME\PROGRAMB\
PRODUCT_ID. If a registry entry is found by the scan method 218 on the client computer 208 that meets this criterion, it constitutes a product match and information for product B is written into the inventory database 402.

The initialization-type product signature 520 generally comprises initialization file properties that indicate the existence of a product on the client computer 208. Examples of initialization file properties illustrated are: an initialization file name 530, an initialization parameter name 532, and an initialization parameter value 534. Other properties may be included in the initialization-type product signature 520. To identify the initialization-type product signature for software product C, the scan method 218 may call an Active X control specified by the detection command 500, for example, that searches the addressable memory 226 of the client computer 208 for the initialization parameter file with the name PROGRAMC.INI. Based on the results of the Active X control, a second Active X control might read PROGRAMC.INI, searching for a parameter name/value pair of
"INSTALL_DIRECTORY=C:/WINDOWS/PROGRAMS/ PROGRAMC". If a file containing this parameter name/value pair is found by the scan method 218 on the client computer 208, it constitutes a product match and information for product C is written into the inventory database 402.

The driver-type product signature 522 generally comprises driver file properties that indicate the existence of a product on the client computer 208. Examples of driver file properties illustrated are: a driver file name 536, a driver file size 538, and a driver file timestamp 540. Other properties may be included in the driver-type product signature 522. To identify the driver-type product signature for hardware item D the scan method 218 may call an Active X control specified by the detection command 500, for example, that searches the addressable memory 226 of the client computer 208 for the driver with the name HARDWARED_DRIVER.DRV that has a timestamp of Jan. 01, 1999 and a size of 10 KB. If a file matching these criteria is found on the client computer 208, it constitutes a product match and information for product D is written into the inventory database 402.

Another type of PSF is the command-type product signature 536 illustrated by the PSF for hardware item H 538. The command-type product signature 536 generally comprises a command response 540 that indicates the existence of a product on the client computer 208 and, optionally, may provide additional information about the existing product. To identify a command-type product signature 540 for hardware item H, the scan method 218 calls an Active X control, for example, to elicit a response from a hardware item on the client computer 208. For example, a sample command-type signature file 540 may call an Active X control specified by the detection command 500 to determine the number of MB available on the hard disk of the client computer 208. The resulting value of the detection command 500 is written into the inventory database 402 along with other information for the hardware match.

The PSFs contained in the product information database 212 allow the opportunity detection object 216 to identify products on the client computer 208. Each product in the product information database 212 is summarized by a PSF containing information such as the product name, vendor name, valid platforms. Each PSF optionally also includes the main product signatures and the parameters that indicate which elements of the scan method 218 should be called to identify the elements of the product signatures.

For example, the PSF for software program A 502 is the first example of such a PSF in the product information database 212. The PSF for software program A 502 contains information about software program A, including the executable-type product signature 516.

Another potential product is illustrated in the PSF for software program B 504. Similar to the PSF for software program A 502, the PSF for software program B 504 contains information about software program B, including the registry-type product signature 518.

Another product is illustrated in a PSF for software program C 506. The PSF for software program C 506 contains information about software program C including the initialization-type product signature 520.

Another possible product type—this one a hardware product—is illustrated in the PSF for hardware item D 508. The PSF for hardware D 508 contains information about hardware D including the driver-type product signature 522. Executable-, registry-, and initialization-type product signatures 516, 518, 520 are not limited to use by software programs. For example, the PSFs 510, 512, 514 for hardware items E, F, and G contain the executable-type product signature 516, the registry-type product signature 518, and the initialization-type product signature 520, respectively.

The PSF for a product may use one or more product signatures. In a preferred embodiment, each product has a primary signature supported by secondary signatures designed to verify that the main signature accurately identified the product. Below is a sample of a PSF for a software product, Microsoft Word 2000, which uses an executable-type product signature 516 as a primary signature and performs other checks against the executable as a secondary validation. The sample PSF also utilizes a registry-type product signature 518 as a secondary signature.

Sample PSF for Microsoft Word 2000
;Word2000.psf
;modified the product name added the 'edition', Last Modified, Arun Aug. 21, 1999
[Product Details]
Product Name=Microsoft Word 2000 Standard Edition
Vendor Name=Microsoft Corporation
Product Type=APPLICATION
Main Signatures=Sig_1
Verifications=Ver_Check_1, Ver_Check_2
Platforms=W95,W98
[Sig_1]
Signature Type=SIG_FILE
Signature Data=winword.exe
[Ver_Check_1]
Verification Type=REG_CHECK
MajorKey=HKEY_LOCAL_MACHINE
MinorKey= SOFTWARE\Microsoft\Windows\CurrentVersion\Uninstall
SubKey=*
ValueName=DisplayName
ValueType=STRING
Condition=STRNOCASECOMPARE, "Microsoft Office 2000 Standard"
[Ver_Check_2]
Verification Type=VERSION_CHECK
File Name=EXE_DIR\winword.exe
Condition=VER_RANGE, "9.0.0000"-"10.0.0000"

It is important to note that the function of the PSF need not necessarily be specified entirely in the product information database 212. The format of the product information database 212 described here is intended to illustrate the functions of identifying a product based on a set of criteria and may be embodied in any number of ways. For example, the scan method 218 may, for some or all signature types, comprise all elements of the PSF needed to detect the presence of a product on the client computer 208, including the detection command 500 and product signature. In another preferred embodiment, the PSFs contained in the product information database 212 may be used to supplement information determined by the detection command for each product in the scan method 218.

User Profile 400

FIG. 6 illustrates an embodiment of the user profile 400. In the user profile illustrated, a plurality of predefined profile options 602 are presented for selection to the user of the client computer. The purpose of the user profile 400 in a preferred embodiment is the collection of further information about the user of the client computer 208 that may optionally be used to supplement the configuration information mined from the client computer 208 through the execution of the scan method 218.

As shown, a number of predefined user profile options 602 are provided for selection by the user. The predefined user profile options may include, for example, a bargain hunter user profile, a business user profile, a professional user profile, a home user profile, a game player user profile, a road warrior user profile.

In another embodiment, the user profile 400 comprises a series of questions designed to elicit further stated preference information from the user of the client computer 208, such as user address, phone number, ZIP code, and the like. Alternately, the user profile 400 is a combination of pre-defined profile and stated preference elements. It is important to note that the user profile may also contain other information about the client computer, the files thereon, and/or the hardware peripherals associated therewith. The contents of the user profile 400 are not limited by the examples provided herein.

The user profile 400 or relevant elements thereof are optionally downloaded to the client computer 208 for use by the opportunity detection object 216 during the execution of the opportunity analysis method 220.

Inventory Database 402

Figure 7:
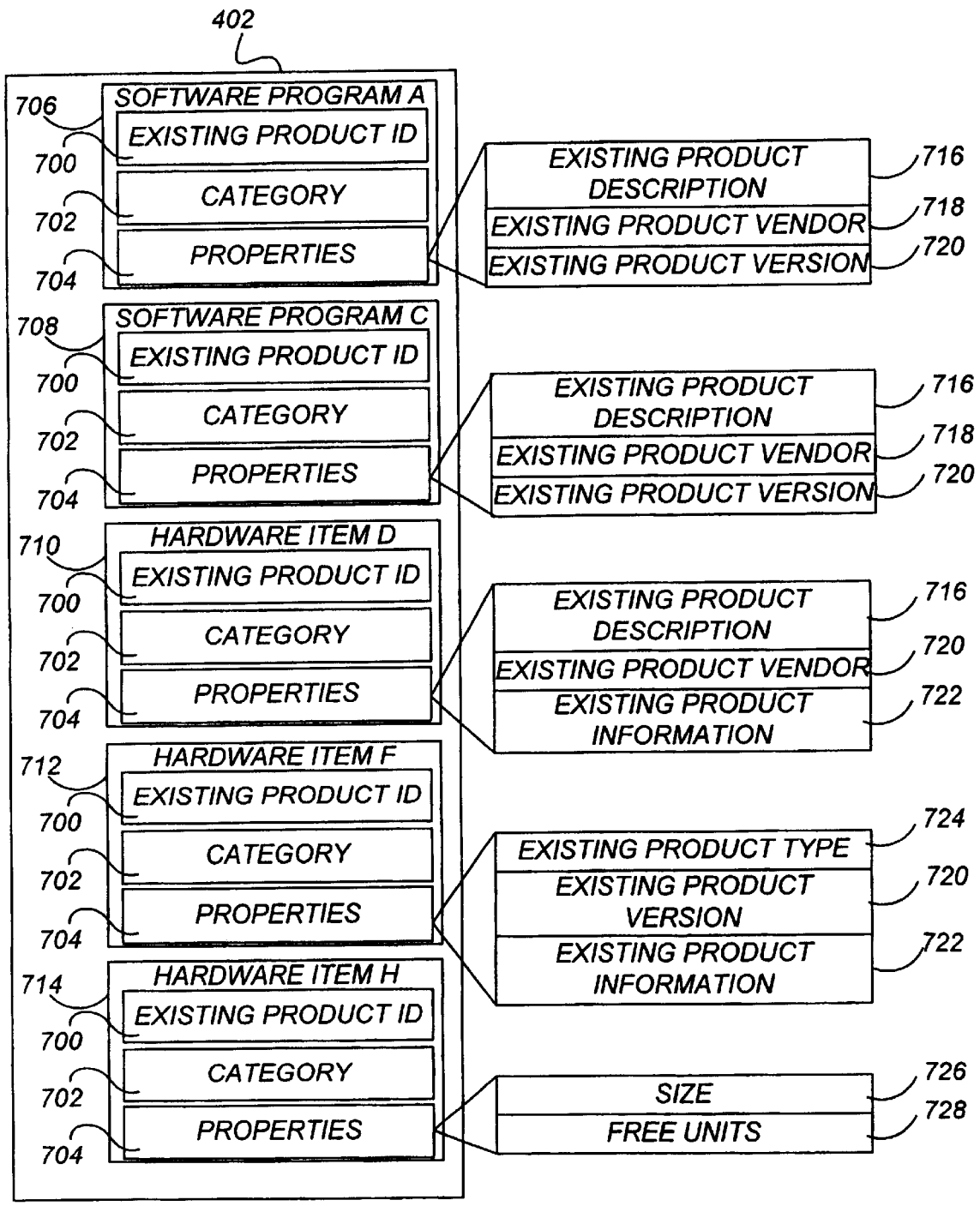
FIG. 7 shows the elements of an inventory database on client computer according to a preferred embodiment.

FIG. 7 illustrates the inventory database 402, preferably on the client computer 208, resulting from the execution of the scan method 218. The inventory database 402 comprises a product record which further comprises an existing product ID 700, an existing product category 702, and an existing product property 704. Note that the product record in the inventory database 402 may comprise one or more existing product categories 702 and/or one or more existing product properties 704.

The inventory database 402 in this illustration comprises a product record for software program A 706, a product record for software program C 708, a product record for hardware item D 710, a product record for hardware item F 712, and a product record for hardware item H 714. Shown for each illustrated product record are the existing product ID 700, the existing product category, and sample values for the existing product properties.

The existing product category 702 identifies the matched product in the inventory database 402 as a particular type of product, for example, software, hard disk, CPU, operating system, hardware peripheral, and the like. Existing product properties 704 include, but are not limited to, an existing product description 716, an existing product vendor 718, an existing product version 720, an existing product information 722, an existing product type 724, a measurement of size 726, and a measurement of free units 728.

In a preferred embodiment, the value resulting from the analysis of the combination of the existing product category 702 and the existing product property 704 determines the opportunity found by the opportunity analysis method 220 and displayed to the user of the client computer 208.

Scan Method & Process for Generating Client Computer Inventory Database

Figure 8:
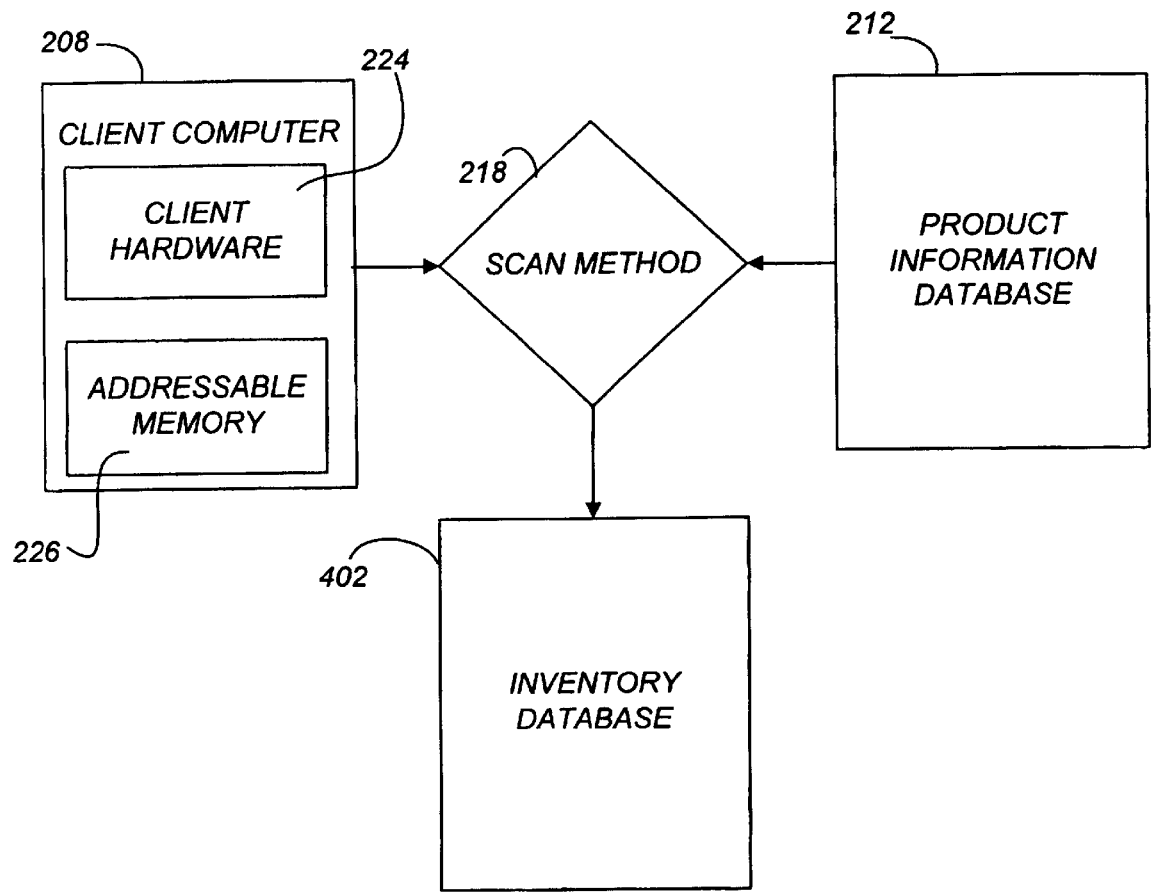
FIG. 8 is an illustration of the process of generating an inventory database according to a preferred embodiment.

FIG. 8 is an illustration of the scan method 218 generating the inventory database 402 according to a preferred embodiment. The scan method 218 compares the contents of the client computer 208 comprised of hardware items 224 and items such as client applications 228, drivers 230, the registry 232, configuration files 234, and operating system 238 in the addressable memory 226 to the PSF for each product in the product information database 212. If the scan method 218 detects the appropriate response from the detection command(s) 500 for each PSF, a product match is identified. The scan method 218 then writes a product record for the matched product to the inventory database 402. The product record for each product comprises information regarding that product, derived from the product information database 212. This information in each product record in the inventory database 402 includes, but is not limited to, the existing product ID 700 for the matched product, the existing product category 702 for the matched product, and the existing product properties 704, such as existing product description 716, existing product vendor 718, existing product version 720, and the like.

Figure 9:
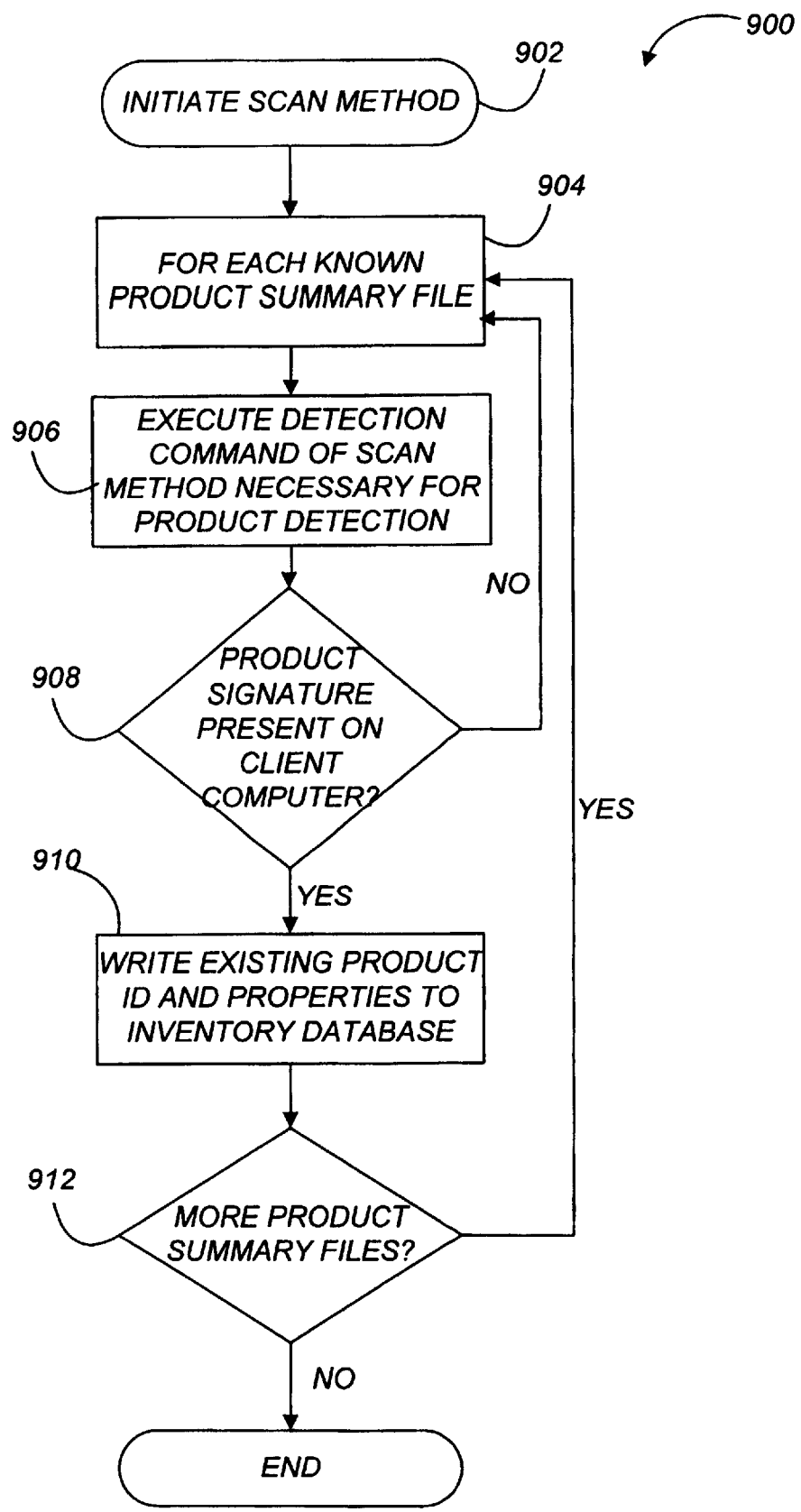
FIG. 9 is a flowchart of the process of executing a scan method to create the inventory database according to a preferred embodiment.

FIG. 9 is a flowchart of illustrating a process 900 of the scan method 218 to generate the inventory database 402 by comparing the contents of the client computer 208 to the product information database 212. The process commences at step 902 when the scan method 218 is initiated. At step 904, the scan method 218 commences the evaluation of the PSFs contained in the product information database 212. At step 906, the scan method 218 executes the detection command 500 indicated by the PSF in order to detect the presence of the product indicated by that PSF. At step 908, the scan method 218 evaluates the product signature in the PSF and compares the product signature elements to the contents of the client computer 208. If it does not find the product signature elements in the contents of the client computer 208, the scan method 218 returns to step 904 to evaluate the next PSF in the product information database 212. If the product signature elements are found in the contents of the client computer 208 in step 908, the scan method 218 optionally writes the existing product ID 700, the existing product category 702, and existing product properties 704, to the inventory database 402 in step 910. At step 912, the scan method 218 determines whether there are more PSFs in the product information database 212 to evaluate. If there are more PSFs to evaluate, the scan method 218 returns to step 904 to evaluate the next PSF in the product information database 212 repeating steps 904, 906, 908, 910, and 912 until a negative response is returned at step 912 and the scan method 218 terminates. In other words, once all of the PSFs have been evaluated, the scan method 218 ends.

Marketing Rule Knowledge Base 214

Figure 10:
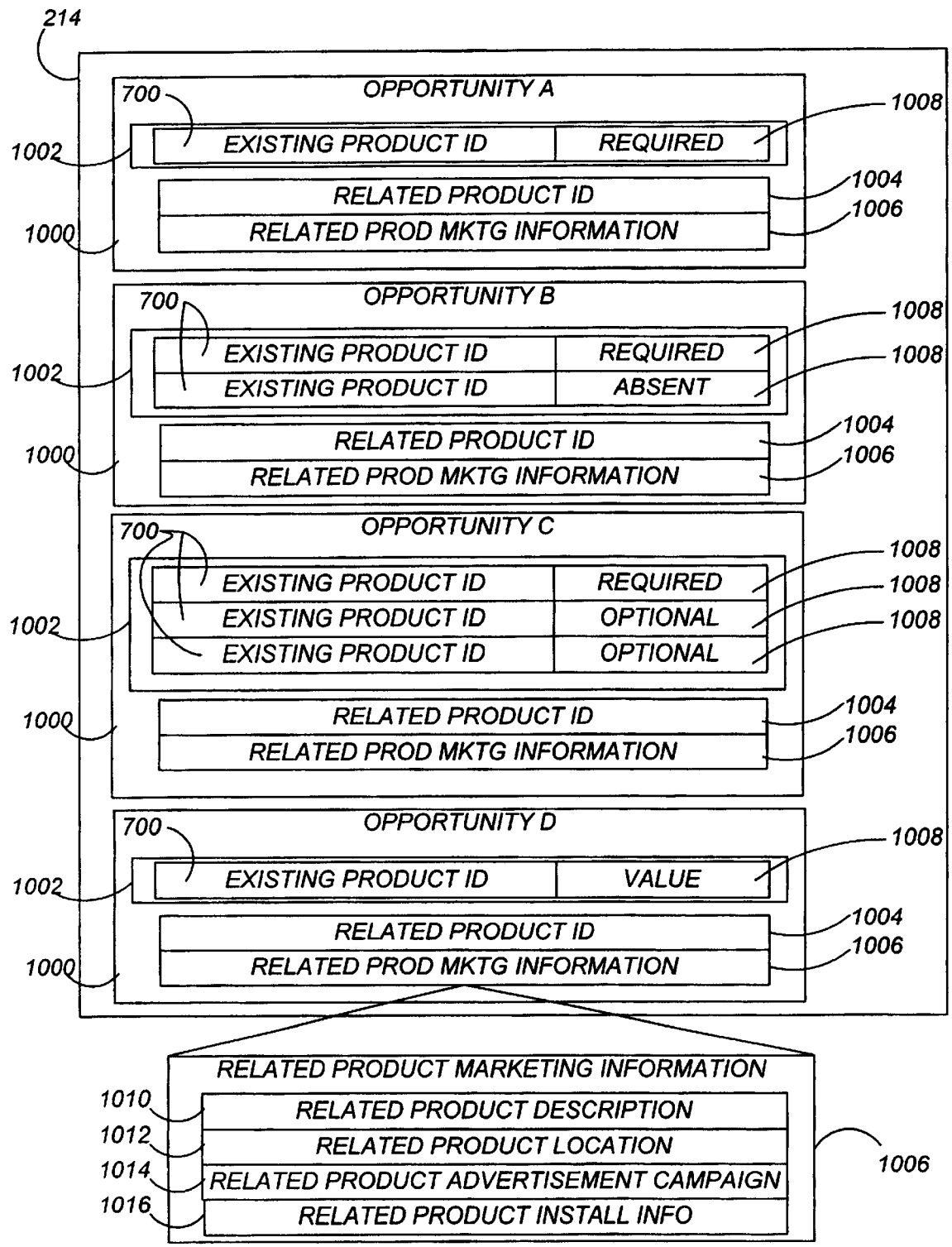
FIG. 10 is a block diagram of a marketing knowledge base according to a preferred embodiment.

FIG. 10 is a block diagram of the marketing rule knowledge base 214 in accordance with a preferred embodiment. The marketing rule knowledge base 214 comprises one or more opportunity rule files 1000. Each opportunity rule file 1000 comprises an opportunity key 1002, a related product ID 1004, and related product marketing information 1006. The opportunity key 1002 specifies the conditions under which an opportunity match occurs and preferably comprises an existing product ID 700 and a match value 1008 for that existing product ID 700. The opportunity key 1002 may comprise one or many existing product IDs 700 and/or match values 1008.

Related product marketing information 1006 comprises, for example, a related product description 1010, a related product location 1012, a related product search string 1014, and a related product advertisement campaign 1016. Additional related product marketing information 1006 is possible and may be included in the opportunity rule file 1000. It is important to note that there may be a set of related product information 1006 for purchasing a related product and a separate set of related product information 1006 for providing more information to the user about the related product. It is noted that "related product" refers to a product to be marketed but not necessarily related to one or more existing products on the client computer 208. Additionally, by way of example, but not limitation, the related product may be a product, such as a hardware item, a software application, a book pertaining to an existing or related product, or may be a service, such as support, training, or the like for an existing or related product. A related product may also be a product that is marketed to the user based upon an inferred profile of the user of the client computer 208 resulting from the analysis conducted by the opportunity detection object 216. For example, if the configuration detected on the client computer 208 is determined to infer that the user of the client computer 208 is a "road warrior", meaning that the user requires both power and mobility in computing products, the related product marketed to that user may be a handheld computing device such as a Palm Computing® connected organizer.

The rules for determining the existence of a marketing opportunity are developed by the service provider and are compiled in the marketing rule knowledge base 214. This expertise is compiled manually or electronically and utilizes data relating to what conditions on the client computer 208 indicate an opportunity to market a related product to the user of the client computer 208. In addition, related product information supplied by vendors of hardware, software, and related products as part of an agreement between the service provider and the vendor or distributor may also be utilized. Further, related product information for products may be independently researched by the service provider for the purposes of providing a useful marketing service for related products to the user of the client computer 208.

The information contained in the marketing rule knowledge base 214 is structured to enable the identification of marketing opportunities based upon the presence or absence of products in the inventory database 402 on the client computer 208. The opportunity key 1002 contains the existing product ID 700 of at least one product that is evaluated against the inventory database 402. The opportunity key 1002 further contains the match value 1008 corresponding to the existing product ID 700. The possible match values 1008 are REQUIRED, OPTIONAL, ABSENT, or a specified or predetermined value of a measurable characteristic resulting from the execution of the detection command 500. Examples of measurable characteristics include processor speed, memory, modem speed.

Each match value 1008 indicates a condition for the presence of the existing product ID 700 in the inventory database 402. The match value 1008 of REQUIRED indicates that for a successful opportunity match to occur, the corresponding existing product ID 700 must be present in the inventory database 402. The match value 1008 of OPTIONAL indicates that the presence of any of the corresponding existing product IDs 700 with an OPTIONAL match value 1008 will constitute a successful match. The match value 1008 of ABSENT indicates that for a successful opportunity match to occur, the corresponding existing product ID 700 must be absent from the inventory database 402. If the match value 1008 is designated as a specified value resulting from the execution of the detection command 500, the opportunity analysis method 220 matches the value as specified. Note that the match value 1008 may be an exact value or a range of values. In addition, the match value 1008 may be a relative number, such as a percentage of available memory.

In a preferred embodiment, the opportunity key 1002 may contain one or more existing product IDs 700 each corresponding to a match value 1008. By way of example, the opportunity rule file 1000 for opportunity A has the opportunity key 1002 of a single existing product ID 700 with a match value 1008 of REQUIRED. Thus, when the inventory database 402 is evaluated against the marketing rule knowledge base 214, only if the existing product ID 700 is found in a product record in the inventory database 402 that matches an existing product ID 700 in the opportunity key 1002 for an opportunity rule file 1000 in the marketing rule knowledge base 214 is the opportunity is considered to be matched.

In another example, the opportunity rule file 1000 for opportunity B has the opportunity key 1002 comprising multiple existing product IDs 700. One existing product ID 700 has an associated match value 1008 of REQUIRED. A second existing product ID 700 has an associated match value 1008 of ABSENT. Thus when the inventory database 402 is evaluated against the marketing rule knowledge base 214, the first existing product ID 700 must be found in the inventory database 402 while the second existing product ID 700 must be absent from the inventory database 402 in order for the opportunity to match.

In yet another example, the opportunity rule file 1000 for opportunity C has the opportunity key 1002 comprising multiple existing product IDs 700. One existing product ID 700 has an associated match value 1008 of REQUIRED. In addition, two existing product IDs 700 have associated match values 1008 of OPTIONAL. Thus, when the inventory database 402 is evaluated against the marketing rule knowledge base 214, the existing product ID 700 with the corresponding match value 1008 REQUIRED must be detected and at least one of the existing product IDs 700 with the corresponding match value 1008 of OPTIONAL must be detected to constitute an opportunity match. If the existing product ID 700 with the match value 1008 of REQUIRED is not present, the opportunity does not match, even if one or all of the existing product IDs 700 with match values 1008 of OPTIONAL are detected. Note that a match value 1008 of OPTIONAL may alternatively indicate that none of the optional existing product IDs 700 need be detected, for example, rather than that at least one of the optional existing product IDs 700 must be detected for an opportunity match to occur.

In another example, the opportunity rule file 1000 for opportunity D has the opportunity key 1002 of a single existing product ID 700 with a match value 1008 of a specific value. Thus, when the inventory database 402 is evaluated against the marketing rule knowledge base 214, if the specified value is detected in the inventory database 402 the opportunity is considered to be matched. As noted previously, the specified value of the opportunity key 1002 may be an exact value or a range of values, and may be represented relatively, e.g. free memory as a percentage of total memory. To illustrate a case where the specified value is a range of values, if free space on a hard disk less than or equal to 30% based on the results of the detection command 500, the opportunity is considered to be matched. As another example, the value specified may be less than or equal to 300 MHz for the speed of the processor.

The related product ID 1004 in the opportunity rule file 1000 is the name of the product or service to be marketed to the user of the client computer 208. An opportunity match between the inventory database 402 and the marketing rule knowledge base 214 results in the related product ID 1004 and its associated related product marketing information 1006 being marketed to the user.

The related product marketing information 1006 optionally comprises the related product description 1010, related product location 1012, related product search string 1014, and any applicable related product advertisement campaign 1016. The related product marketing information 1006 specified here is done so by way of example and is not meant to limit the types of related product marketing information 1006 that can be included in the opportunity rule file 1000 for any product marketing opportunity.

The related product description 1010 may contain information about the related product, such as version number, manufacturer, distributor, advertisement campaign information, installation instructions, pricing, additional marketing information and the like.

The related product location 1012 may be a URL location at which the related product is available for download, a location where additional marketing information is available, or a location from which the product may be purchased (for example, from the vendor computer system 202).

The related product search string 1014 may be used to search external systems for the related product. In a preferred embodiment, this related search string 1014 may include the related product ID 1004 and required parameters and format that are sent as search criteria to a search engine on the vendor computer system 202 for purposes of retrieving purchase or further marketing information regarding the related product. The location of the external search engine is specified as a component in the related product marketing information 1006. In another preferred embodiment, the related product search string 1014 is optimized for the external search engine to which it will be sent, including the search engine-specific search key that will result in the match desired by the service provider.

The related product marketing information 1006 may also contain the related product advertisement campaign 1016 specifying what information to provide to the client computer 208 advertising a related product. In a preferred embodiment, the related product advertisement campaign 1016 may be parameters sent to the advertising server on the service provider computer system 206. The advertising server then interprets the parameters and returns the value to the client computer 208.

All components of the related product marketing information 1006 are optional. Any combination of the exemplary components presented above may be present in any given opportunity rule file 1000 for a marketing opportunity in the marketing rule knowledge base 214.

In a preferred embodiment, some or all components of the related product marketing information 1006 may be stored as parameters on the client computer 208. These parameters may optionally be sent to the service provider computer system 206 upon which may reside a marketing information server. The marketing information server in a preferred embodiment processes the parameters received from the client computer 208 and delivers to the client computer 208 relevant marketing information based upon those parameters. For example, the related product location 1012 for a matched opportunity may be stored as one or more parameters in the client computer 208. When the presentation method 222 displays information to the user of the client computer 208, the parameter of the related product location 1012 is transmitted to the marketing information server, which returns a set of instructions to the client computer Web browser for the display of the appropriate URL and/or graphic for the commerce opportunity and/or advertisement. Advantageously, this preferred embodiment may allow the service provider to track opportunities passed through to vendor computer systems 202 and may provide increased flexibility in maintaining the most up-to-date product marketing information.

Where they are explicitly included in an opportunity rule file 1000, the links to URLs contained in the related product information 1006 are preferably maintained by the service provider. A method for ensuring that links to URLs contained in the related product information 1006 are valid is detailed in the application, "Automatic Updating of Diverse Software Products on Multiple Client Computer Systems", U.S. Ser. No. 08/660,488, filed with the USPTO on Jun. 7, 1996 which is incorporated herein by reference in its entirety.

Figure 11:
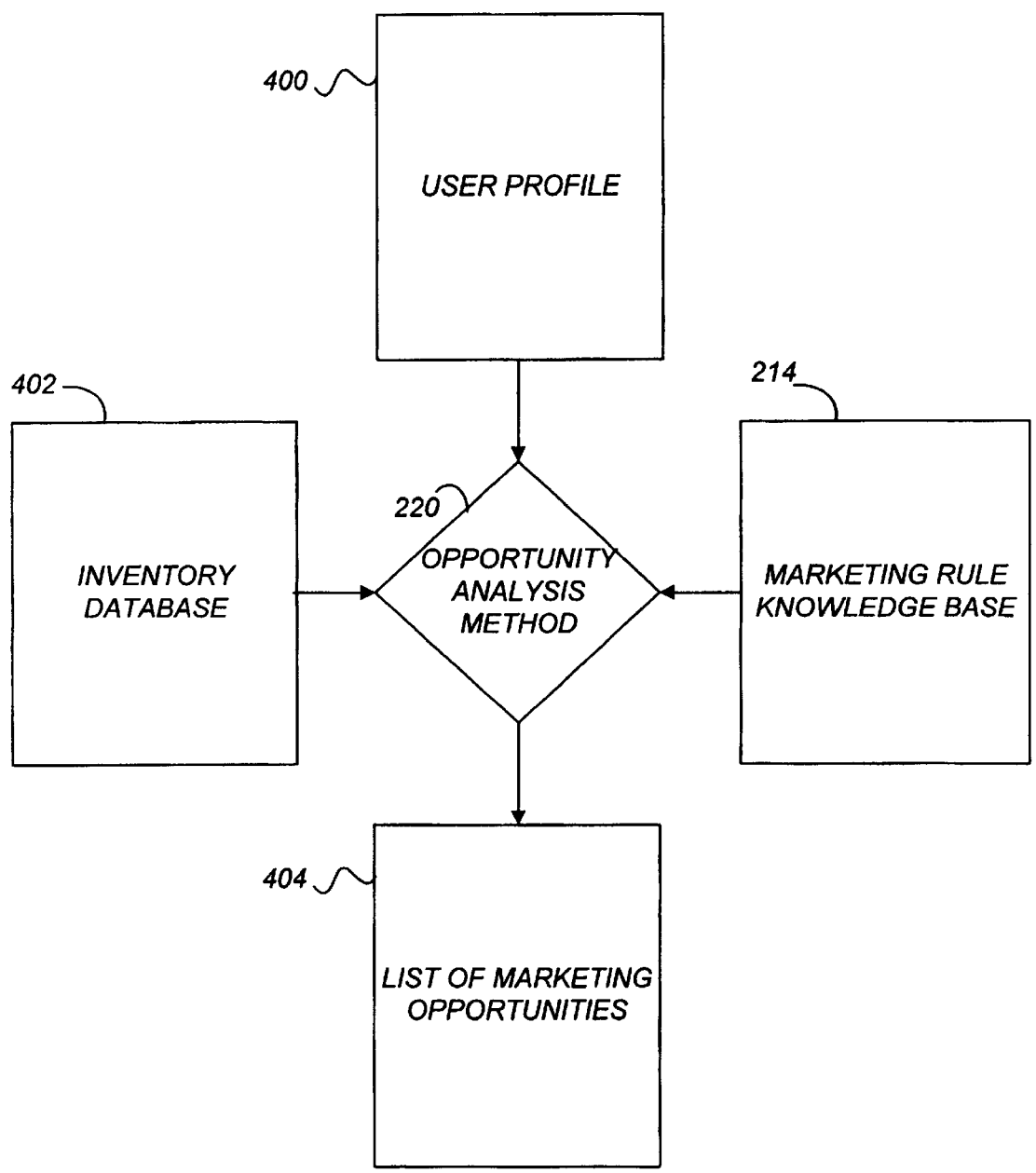
FIG. 11 is an illustration of the process of detecting marketing opportunities according to a preferred embodiment.

Marketing Opportunity Analysis Method 202 and List of Marketing Opportunities 404 Generated Thereby FIG. 11 is an illustration of the opportunity analysis method 220 that identifies marketing opportunity matches on the client computer 208. The opportunity analysis method 220 compares the marketing rule knowledge base 214 and, optionally, the user profile 400, with the inventory database 402 that resulted from the execution of the scan method 218. The results of the opportunity analysis method 220 are written to the list of marketing opportunities 404. The list of marketing opportunities 404 comprises multiple opportunity match records and is described below in detail with reference to FIG. 12.

The opportunity analysis method 220 evaluates the opportunity rule file(s) 1000 in the marketing rule knowledge base 214 to determine whether the conditions present on the client computer 208 match the opportunity keys 1008 in each opportunity rule file 1000. For each successful match of the opportunity key 1008 of an opportunity rule file 1000 in the marketing rule knowledge base 214, the opportunity analysis method 220 preferably records the following information specified by the opportunity analysis method 220 into the list of marketing opportunities 404: the existing product ID 700, the related product ID 1004, and related product marketing information 1006.

Optionally, the opportunity analysis method 220 additionally evaluates the user profile 400 along with the marketing rule knowledge base 214 against the inventory database 402. When the user profile 400 is considered by the opportunity analysis method 220, the preferences in the user profile 400 that are predefined, stated, and/or inferred are evaluated to further define the marketing information to be presented to the user of the client computer 208. By way of example, but not limitation, if the opportunity analysis method 220 identifies the opportunity match for marketing an Internet Service Provider (ISP) through the detection in the inventory database 402 of the correct opportunity key 1002 for the opportunity rule file 1000 in the marketing rule knowledge base 214, the opportunity analysis method 220 may utilize a stated preference in the user profile 400 such as the user's ZIP code to market a more specific opportunity to the user. Opportunities further specified by information in the user profile 400 need not be based upon explicitly stated preferences but may be based upon information inferred from any stated preferences given by the user in the user profile 400.

Figure 12:
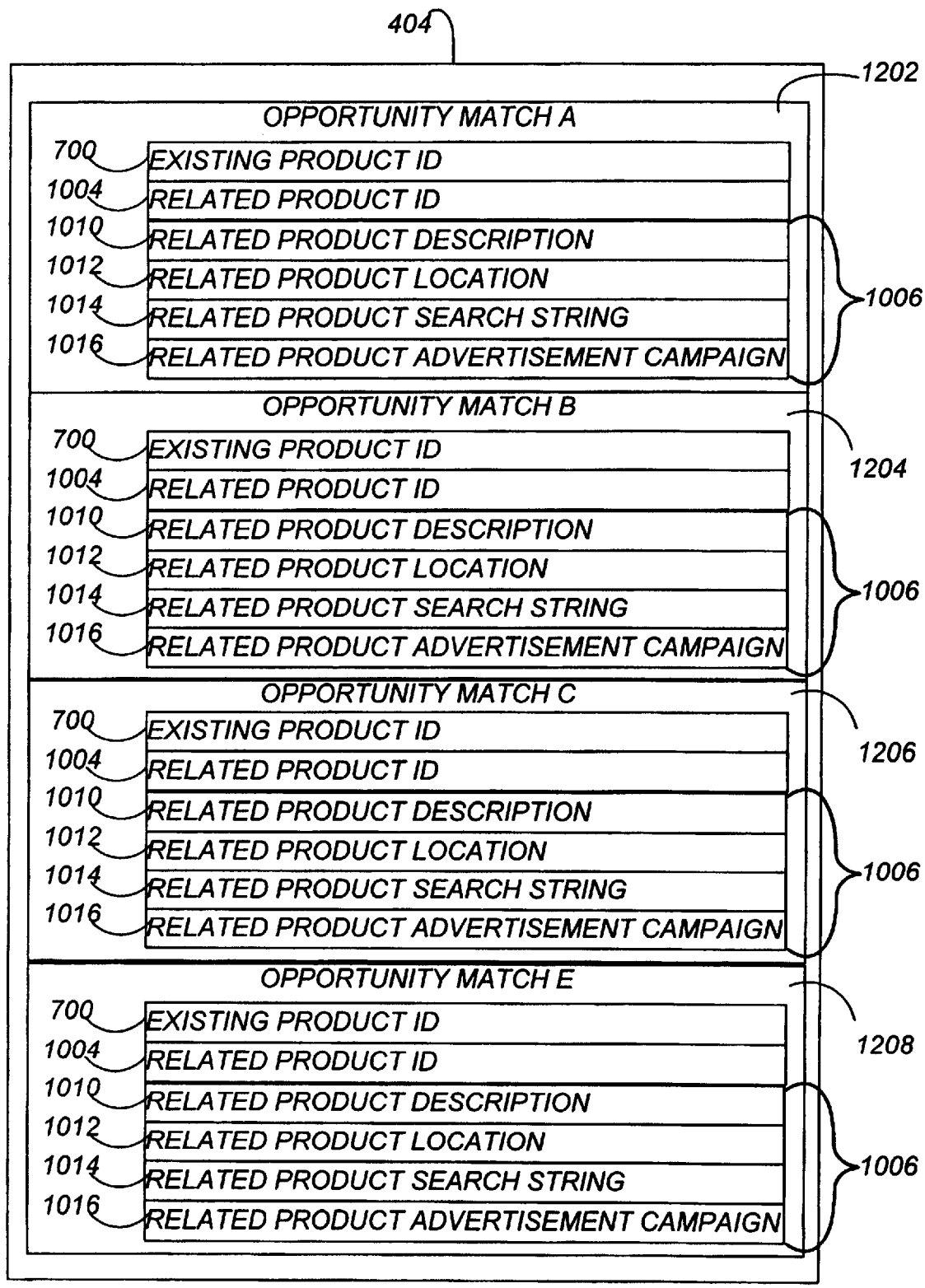
FIG. 12 shows a list of marketing opportunities according to the preferred embodiment.

FIG. 12 illustrates the list of marketing opportunities 404 generated as a result of the opportunity analysis method 220. In the example illustrated, four opportunity matches resulted from the execution of the opportunity analysis method 220: a record for opportunity match A 1202, a record for opportunity match B 1204, a record for opportunity match C 1206, and a record for opportunity match D 1208. In this illustration, the information recorded in each opportunity match is the existing product ID 700, related product ID 1004, and related product marketing information 1006. In this example, the related product marketing information 1006 further comprises the related product description 1010, the related product description 1012, the related product search string 1014, and the related product advertisement campaign 1016. Other information provided in the inventory database 404, such as existing product category 702, existing product properties 704, and the like is optionally recorded for each opportunity in the list of marketing information 404.

The information about the matched opportunities contained in each opportunity match record is derived from the marketing rule knowledge base 214 and the inventory database 402. It is important to note that any information contained in either the marketing rule knowledge base 214 or the inventory database 402 may be utilized by the list of marketing opportunities 404. The items detailed above are for the purposes of illustration only and should not be construed as limiting the potential contents of the list of marketing opportunities 404.

Presentation of Marketing Information to the User

Figure 13:
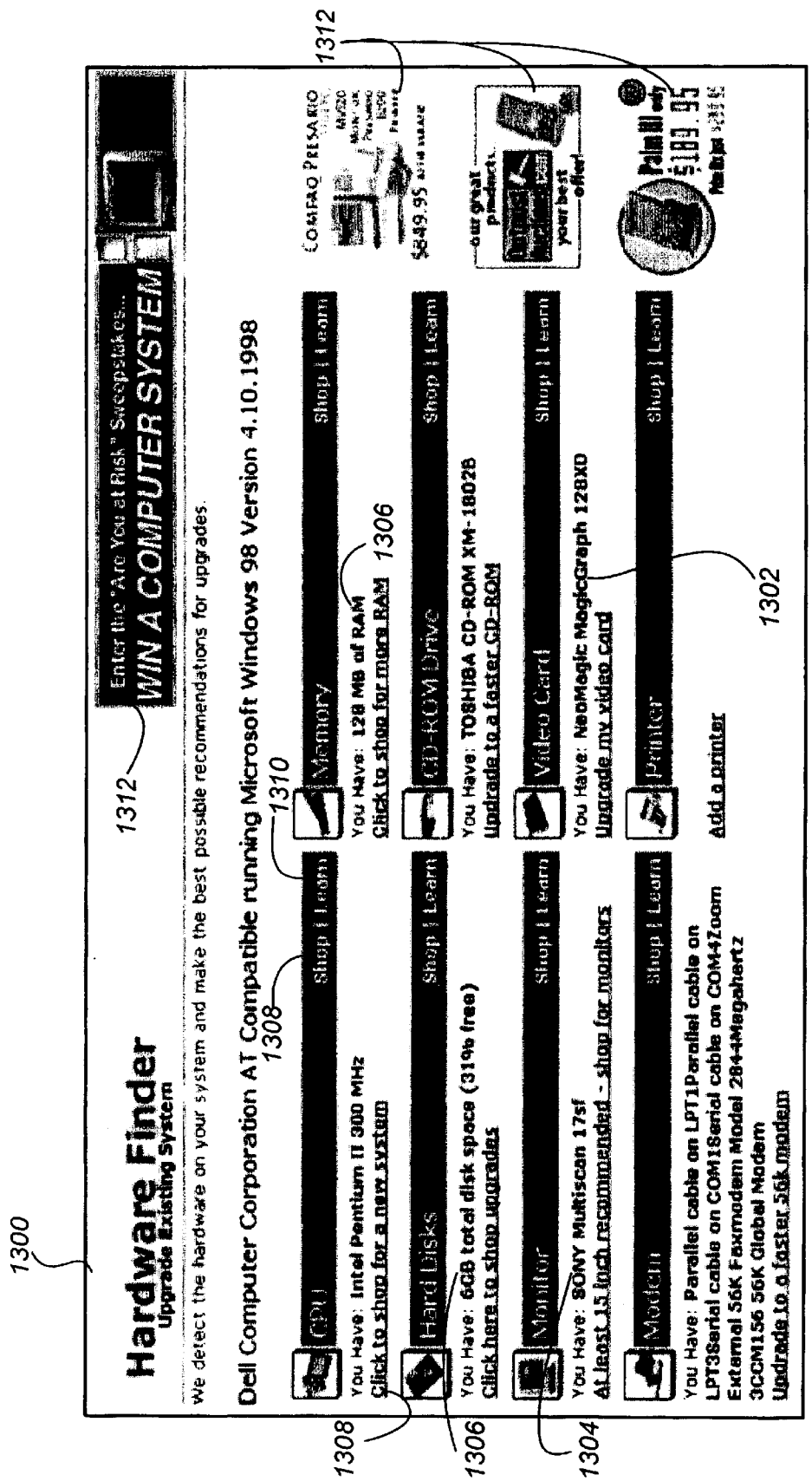
FIG. 13 shows a sample display of marketing information to a user based upon the configuration of a client computer.

FIG. 13 illustrates an example of a screen of marketing information presented to the user of the client computer 208 as a result of the execution of the opportunity detection object 216. An active marketing results page 1300 is presented to the user of the client computer 208. The active marketing results page 1300 optionally displays the following information to the user based upon the results of the presentation method 222: an existing product name 1302, an existing product vendor name 1304, existing product information 1306, a marketing link to purchase related products 1308, a marketing link to learn more about related products 1310, and an advertisement 1312 for related products.

The presentation method 222 of the opportunity detection object 216 analyzes the list of marketing opportunities 404 on the client computer 208 to determine what information to present to the user and how to present it. As illustrated by FIG. 13, the existing product name 1302 displayed to the user is based upon the existing product ID 700 in and is derived from the list of marketing opportunities 404. This existing product name may be the name of a specific product such as "NeoMagic MagicGraph 128XD" or a generic item.

The existing product vendor name 1304 may be displayed by the presentation method 222 and is also derived from the list of marketing opportunities 404. In another preferred embodiment, the presentation method 222 may read directly from the marketing information database 214, product information database 212, user profile 400 and the like to retrieve any information it requires to display marketing information to the user.

Other existing product information 1306 may be provided to the user as a result of the execution of the presentation method 222. Other existing product information may be, for example, the existing product version 720, the measurement of size 726, and/or the measurement of free units 728. To illustrate the display of other existing product information 1306, FIG. 13 shows the measurement of size 726 and the measurement free units 728 for the hard disk on the client computer under the Hard Disks category ("You Have: 6 GB total disk space (31% free)").

The marketing link to purchase related products 1308 and the marketing link to learn more about related products 1310 are produced by the presentation method 222 based on information in the list of marketing opportunities 404. For every opportunity match record in the list of marketing opportunities 404, the presentation method 222 evaluates the related product information 1006 contained in the opportunity match record. Based on this related product information 1006, the presentation method 222 executes to provide the relevant marketing information to the user of the client computer 208. For example, if the presentation method 222 analyzing an opportunity match record detects a related product description 1010 in the related product information 1006, then the marketing link to learn more about related products 1310 may link to a page comprising the related product ID 1004 and the related product description 1010. In another example, if the presentation method 222 analyzing an opportunity match record detects a related product location 1012 in the related product information 1006, the marketing link to purchase related products 1308 may connect the user to the vendor computer system 202 to purchase the software. In another illustration, if the presentation method 222 analyzing an opportunity match record detects a related product search string 1014 in related product information 1006 designated as purchase information, the marketing link to purchase related products 1308 may connect the user to the vendor computer system 202 with the value of the related product search string 1014 passed as a parameter to a search engine on the vendor computer system 202.

Another example of marketing information displayed to the user of the client computer is the advertisement 1312 for related products. In a preferred embodiment, the advertisement 1312 displayed to the user is based upon the related product advertisement campaign 1016 in the list of matched opportunities 404. Optionally, the advertisement 1312 displays during a subsequent session between the client computer 208 and the service provider computer system 206. Information about the related product advertisement campaign 1016 specific to the client computer 208 may be accessed by the presentation method 222 resident on the client computer 208 without the need for executing the entire opportunity detection object 216 during the subsequent sessions.

In summary, the present invention provides a method for accurately creating the inventory database 402 of software and hardware products and components or peripherals on the client computer 208 across the network 204 (with or without explicit acknowledgement by the user of the client computer 208) and marketing related products to the user. Using the method described as part of the present invention, it is possible to identify hardware and software products associated with the client computer 208 and identify marketing opportunities that are triggered by the absence or presence of one or more products and/or a specific value resulting from the execution of a detection command 500 on the client computer 208. The related products marketed to the user by this method are relevant to the user because they are based upon current configuration of the client computer 208 combined, optionally, with the contents of the user profile 400 completed by the user.

By compiling and maintaining instructions about marketing opportunities from of the marketing rule knowledge base 214 that is analyzed by the opportunity detection object 216, it is possible to provide the user with real, actionable marketing information. As is evident, the marketing information presented to the user may include any combination of commerce opportunities, advertisements displayed to the user, additional information about related products, and the like. By way of example, the user is provided with a simple, accessible way to purchase or learn more about a related product directly relevant to the user's client computer configuration in a number of different ways, such as presenting links to purchase related products 1308 (commerce opportunities), marketing links to learn more about related products 1310 (additional information), advertisements 1312 for related products (advertisement display) based on the contents of the inventory database, and the like.

A system memory and a hard drive of a computer system, whether the service provider computer system or the client computer, can be utilized to store and retrieve software programs incorporating computer code that implements aspects of the invention, data for use with the invention, and the like. Exemplary computer readable storage media include CD-ROM, floppy disk, tape, flash memory, system memory, hard drive, as well as a data signal embodied in a carrier wave (e.g., in a network such as the Internet).

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for marketing using information on a client computer, comprising:

scanning for products associated with the client computer, the scanning includes scanning the client computer and comparing results of the client computer scanning against a product information database;

generating a client computer product inventory based on products associated with the client computer as determined in said scanning;

performing an opportunity analysis to identify marketing opportunities, said performing the opportunity analysis includes comparing marketing rules of a marketing rule knowledge base to the client computer product inventory; and presenting the detected marketing opportunity to the user of the client computer upon detection of a marketing opportunity.

2. The method for marketing using information on a client computer according to claim 1, wherein said scanning the client computer includes scanning for at least one of software files, operating system, hardware peripherals, and hardware components.

3. The method for marketing using information on a client computer according to claim 1, wherein said marketing rule knowledge base includes a first marketing rule file defining a marketing opportunity and a condition for a product in the client computer inventory for the marketing opportunity, the condition being of a predefined value selected from the group consisting of absent, present, optional, and value of a measurable characteristic of the product in the client computer inventory.

4. The method for marketing using information on a client computer according to claim 1, wherein said product information database includes a product summary file including a detection command and a product signature comprising a value for indicating association of the product with the client computer.

5. The method for marketing using information on a client computer according to claim 4, wherein said scanning for products associated with the client computer includes executing the detection command to detect a presence of a product signature on the client computer, and, upon detection of the product signature on the client computer, writing a product record of the detected product associated with the client computer to said client computer inventory.

6. The method for marketing using information on a client computer according to claim 5, wherein each product record comprises at least one of an existing product identification, an existing product category, and an existing product property of the detected product associated with the client computer.

7. The method for marketing using information on a client computer according to claim 4, wherein said product summary file is selected from the group consisting of a software product summary file, a hardware product summary file, and an operating system product summary file.

8. The method for marketing using information on a client computer according to claim 4, wherein said product signature of the product summary file is selected from the group consisting of an executable-type product signature, a registry-type product signature, an initialization-type product signature, a driver-type product signature, and a command-type product signature.

9. The method for marketing using information on a client computer according to claim 8, wherein the product signature of the product summary file is an executable-type product signature, the executable-type product signature comprising at least one executable file property for indicating a presence of a product on the client computer.

10. The method for marketing using information on a client computer according to claim 9, wherein the executable file property is selected from the group consisting of an executable name, an executable file size, and an executable timestamp.

11. The method for marketing using information on a client computer according to claim 8, wherein the product signature of the product summary file is a registry-type product signature, the registry-type product signature comprising at least one registry entry for indicating a presence of a product on the client computer.

12. The method for marketing using information on a client computer according to claim 8, wherein the product signature of the product summary file is an initialization-type product signature, the initialization-type product signature comprising at least one initialization file property for indicating a presence of a product on the client computer.

13. The method for marketing using information on a client computer according to claim 12, wherein the initialization file property is selected from the group consisting of initialization file name, initialization parameter name, and initialization parameter value.

14. The method for marketing using information on a client computer according to claim 8, wherein the product signature of the product summary file is a driver-type product signature, the driver-type product signature comprising at least one driver file property for indicating a presence of a product on the client computer.

15. The method for marketing using information on a client computer according to claim 14, wherein the driver file property is selected from the group consisting of driver file name, driver file size, and driver file timestamp.

16. The method for marketing using information on a client computer according to claim 1, further comprising storing at least one of the product information database and the marketing rule knowledge base in the client computer.

17. The method for marketing using information on a client computer according to claim 1, wherein the detected marketing opportunity is selected from the group consisting of a product commerce marketing opportunity, a service advertisement marketing opportunity, and a product advertisement marketing opportunity.

18. A system for marketing using information on a client computer, comprising:
a product information database;
a scanning engine for detecting products associated with the client computer and for generating a client computer product inventory by comparing result of the detecting against the product information database;
a marketing rule knowledge base having marketing rules;
an opportunity analysis engine for identifying marketing opportunities by comparing the marketing rules of the marketing rule knowledge base to the client computer product inventory; and
a presentation engine for presenting the detected marketing opportunity related to the client computer upon detection of a marketing opportunity.

19. The system for marketing using information on a client computer according to claim 18, wherein said marketing rule knowledge base includes a marketing rule file defining a marketing opportunity and a condition for a product in the client computer inventory for the marketing opportunity, the condition being of a predefined value selected from the group consisting of absent, present, optional, and value of a measurable characteristic of the product in the client computer inventory.

20. The system for marketing using information on a client computer according to claim 18, wherein said product information database includes a product summary file including a detection command and a product signature comprising a value for indicating association of the product with the client computer.

21. The system for marketing using information on a client computer according to claim 20, wherein said scanning engine executes the detection command of the product summary file to detect a presence of a product signature on the client computer, and, upon detection of the presence of the product signature, writes a product record of the detected product associated with the client computer to said client computer inventory.

22. The system for marketing using information on a client computer according to claim 20, wherein said product signature of the product summary file is selected from the group consisting of an executable-type product signature, a registry-type product signature, an initialization-type product signature, a driver-type product signature, and a command-type product signature.

23. A computer product for marketing using information on a client computer, comprising:
computer code that scans for products associated with the client computer, the computer code that scans for products includes computer code that scans the client computer and compares results of the client computer scanning against a product information database;

computer code that generates a client computer product inventory based on products associated with the client computer as determined by the computer code that scans for products;

computer code that performs an opportunity analysis to identify marketing opportunities, the computer code that performs the opportunity analysis includes computer code that compares marketing rules of a marketing rule knowledge base to the client computer product inventory; and computer code that presents the detected marketing opportunity to the user of the client computer upon detection of a marketing opportunity; and a computer readable medium that stores said computer codes.

24. The computer product for marketing using information according to claim 23, wherein the marketing rule knowledge base includes a first marketing rule file defining a marketing opportunity and a condition for a product in the client computer inventory for the marketing opportunity, the condition being of a predefined value selected from the group consisting of absent, present, optional, and value of a measurable characteristic of the product in the client computer inventory.

25. The computer product for marketing using information according to claim 23, wherein the product information database includes a product summary file including a detection command and a product signature comprising a value for indicating association of the product with the client computer.

26. The computer product for marketing using information according to claim 25, wherein said computer code that scans includes computer code that executes the detection command to detect a presence of a product signature on the client computer, and, upon detection of the presence of the product signature on the client computer, writes a product record of the detected product associated with the client computer to the client computer inventory.

27. The computer product for marketing using information according to claim 25, wherein the product signature of the product summary file is selected from the group consisting of an executable-type product signature, a registry-type product signature, an initialization-type product signature, a driver-type product signature, and a command-type product signature.

* * * * *